US006647469B1

(12) United States Patent
Sharma et al.

(10) Patent No.: US 6,647,469 B1
(45) Date of Patent: Nov. 11, 2003

(54) USING READ CURRENT TRANSACTIONS FOR IMPROVED PERFORMANCE IN DIRECTORY-BASED COHERENT I/O SYSTEMS

(75) Inventors: Debendra Das Sharma, Santa Clara, CA (US); Sharon M. Ebner, Mountain View, CA (US); John A. Wickeraad, Granite Bay, CA (US); Joe P. Cowan, Fort Collins, CO (US); Carl H. Jackson, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,191

(22) Filed: May 1, 2000

(51) Int. Cl.$^7$ ................................................ G06F 12/00
(52) U.S. Cl. ....................................... 711/147; 711/141
(58) Field of Search ................................ 711/141, 147, 711/144, 146; 710/22

(56) References Cited

U.S. PATENT DOCUMENTS 5,867,644 A    2/1999  Ranson et al. ......... 395/183.15
6,018,763 A  * 1/2000  Hughes et al. .............. 709/213

OTHER PUBLICATIONS

M. Papamarcos and J. Patel, "A Low Overhead Coherent Solution for Microprocessors with Private Cache Memories," in Proceedings of the 11th International Symposium on Computer Architecture, IEEE, New York (1984), pp. 348–354.

\* cited by examiner

Primary Examiner—Kimberly McLean-Mayo

(57) ABSTRACT

A shared memory provides data access to a plurality of agents (e.g., processor, cells of processors, I/O controllers, etc.) and includes a memory and a memory controller. The memory controller selectively provides memory access to the agents in both coherent and read current modes of operation. In the coherent mode, the memory controller ensures that the data stored in system memory is accurately and precisely mirrored in all subservient copies of that data as might typically be stored in agent cache memories. Using, for example, a MESI type protocol, the memory controller limits access to memory so that only an "owner" or a particular portion or line of memory has write access and that, during the extension of these write privileges, no other agent has a valid copy of the data subject to being updated. Thus, the memory controller implements a first set of rule in the coherent mode of operation to insure that all copies of data stored by the agents are coherent with data stored in the memory. In a read current mode of access, a read-once segment of data is copied to an agent with the agent implementing a second set of rules to minimize or eliminate the possibility that the data might become stale prior to use or that it be misused by another agent or process. Thus, in the read current, an "uncontrolled" copy of the data is released subject to certain restrictions to be implemented by the receiving agent as defined by a second set of rules. For example, these rules require that the agent's copy of data be provided as an output and then invalidated within a predetermined period of time, that the agent have limit access to the memory during any set of fetch operations to no more than a predetermined maximum block size. Also included is a requirement that the copy of data include only that data contained within a range of memory addresses, the range beginning within a predetermined block of memory addresses and continuing through an end of block address. These limitations limit the amount of data that might be subject to misuse, particularly in the case of a failure resulting in the inability of a requesting agent to complete a transaction according to the rules.

20 Claims, 15 Drawing Sheets

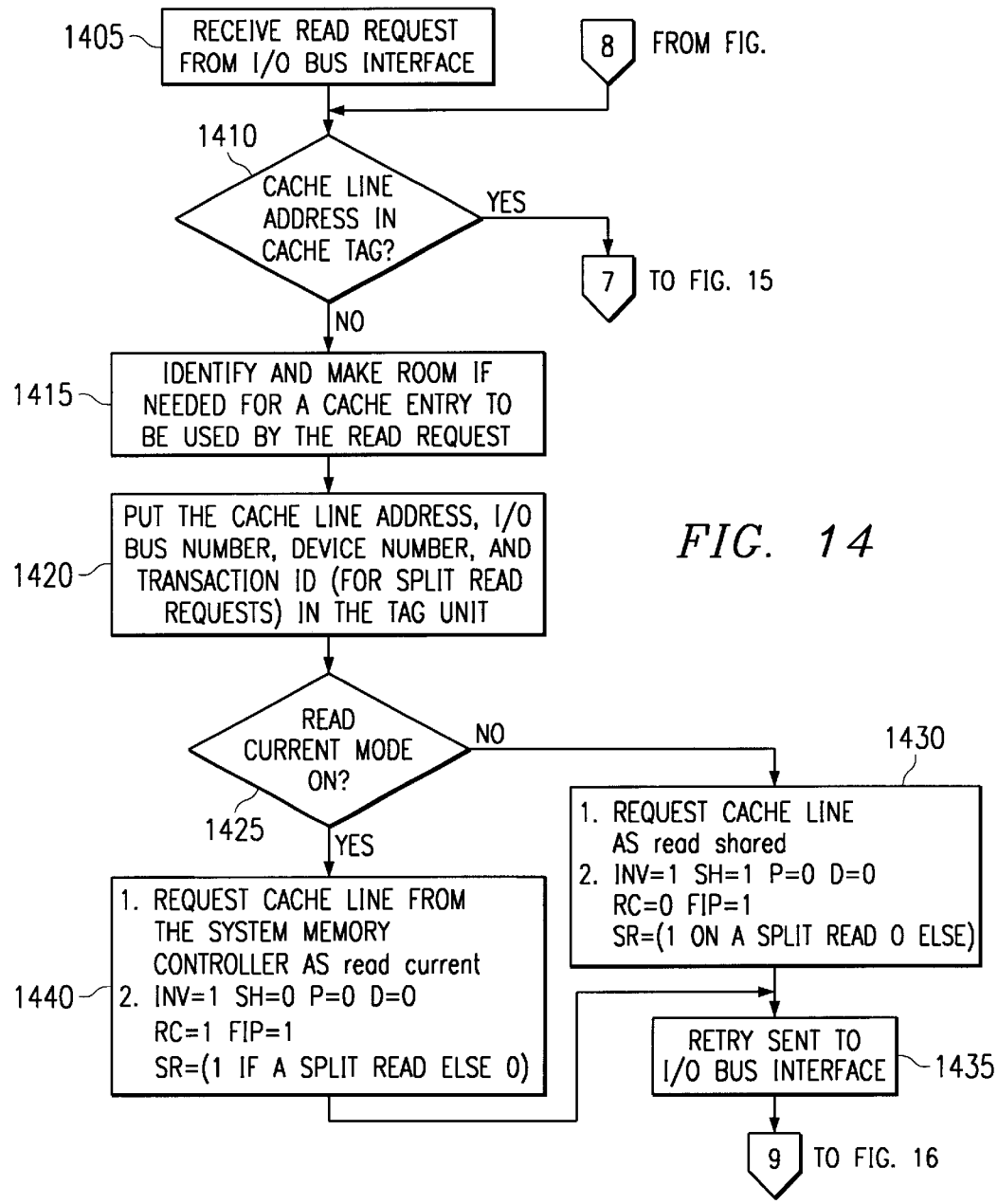

USING READ CURRENT TRANSACTIONS FOR IMPROVED PERFORMANCE IN DIRECTORY-BASED COHERENT I/O SYSTEMS

TECHNICAL FIELD

This invention relates generally to computer memory systems and more particularly to an access method for reading from a shared memory to an I/O device.

BACKGROUND

In a computer system, problems often arise when more than one device attempts to access information stored in a memory location. While multiple devices can access a single memory location, if one of the accessing devices attempts to update the information in the memory location, without informing the other devices who also have access to the specific memory location, data mismatches may occur resulting in a loss of data coherency.

To speed access and minimize data latency, some memory accessing devices use a local memory cache. Within the local cache the device may store a copy of information which it has recently accessed. Thus, there may be several copies of information scattered throughout a system.

When a system implements local cache, main and cache memory may be organized into cache lines. A cache line is typically 64 bytes of data. Therefore, when a device attempts to access a specific memory location the cache controller first searches its local cache to determine if it already has a copy of the information available. If a copy of the requested memory location is not currently stored in the local cache, the cache controller attempts to obtain a copy of the cache line from the system memory controller. If the information is available in the local cache, the device will use the information in the local cache. Issues arise when multiple devices attempt to access the same cache line, and each device stores copies of this information in local cache. Not only must access conflicts be resolved, but procedures must be implemented to ensure coherency of the various copies of the data contained in the multiple caches and in the main memory.

Numerous protocols exist which maintain cache coherency across multiple caches and main memory. One such protocol is called MESI. MESI protocol, which is described in detail in M. Papamarcos and J. Patel, "A Low Overhead Coherent Solution for Multiprocessors with Private Cache Memories," in Proceedings of the 11$^{th}$ International Symposium on Computer Architecture, IEEE, New York (1984), pp. 348–354, incorporated herein by reference. MESI stands for Modified, Exclusive, Shared, Invalid. Under the MESI protocol, a cache line is categorized according to its use. A modified cache line indicates that the particular line has been written to by the cache that is the current owner of the line. An exclusive cache line indicates that a cache has exclusive ownership of the cache line, which will allow the cache controller to modify the cache line. A shared cache line indicates that one, or more than one, cache(s) have ownership of the line. A shared cache line is considered read only and any device under the cache may read the line but no one is allowed to write to the cache. A cache line with no owner identifies a cache line whose data may not be valid since the cache no longer owns the cache line.

While MESI is a standard term in the industry, other classifications or nomenclature are frequency employed. Modified cache lines are typically referred to as private dirty. Exclusive cache lines are typically referred to as private cache lines. Private cache lines which have not been updated are typically referred to as private clean cache lines.

If a specific device requires access to a specific memory location it will check its local cache to determine if the information is available there. If the information is not currently contained within the local cache, the cache controller will go to main memory to access the information. Before requesting the cache line from the system memory controller, the cache controller decides what type of ownership for the line it will seek (i.e. shared, private, etc.). If a cache wants private ownership of a cache line, the system memory controller will ensure that no cache has the same line. The system memory controller will not allow any other cache to get ownership of this line so the cache's access to the line will be private. If the cache's access to the line is shared, more than one cache may have the same line as shared simultaneously.

A cache must have private or exclusive ownership of a cache line to modify the line. That is, other copies may not be relied upon as being valid until after the data is modified and an updated version is supplied. If the cache line is currently categorized as read only, the cache which needs to update the information must make a request to the system memory controller, for exclusive access to the cache line. The system memory controller then identifies any other caches having access to the cache line, and makes the necessary arrangements for the other caches to relinquish access and for the requesting cache to have exclusive use of the cache line.

One method for a cache to obtain the exclusive use of a cache line is for the memory controller to invalidate other copies of the cache line currently in use. Once other caches' access to the cache line has been invalidated, the remaining cache has exclusive use of the cache line and can update the cache line accordingly.

One of the methods to implement cache coherency is a directory-based system where rather than sending each transaction to every other agent or other processor in the system a table is maintained for each cache line which indicates which agent(s) have the cache line. The system memory controller consults with the directory to see the status of the cache line before it allows a cache to get data. For example, another cache has the cache line as private, the memory controller recalls the cache line from the original owner.

A device first checks its local cache to determine whether the information is available. If the information it requires is not locally available, the cache controller servicing the device sends a read request for shared ownership of the cache line via the system interconnect fabric to the system memory controller. If the requested cache line is shared or is not in use by any other cache, the system memory controller sends the data from main memory to the requesting cache directory reflecting the new owner of the cache line in shared mode. Once the requesting device has completed its use of the cache line, the cache controller sends a message relinquishing ownership of the cache line to the system memory controller. Upon receipt of his message the system memory controller removes the cache as a shared owner from its directory tag. If the cache controller had requested private access to the cache line but had updated the information stored within the cache line, the cache controller also sends updated information to the system memory controller. Each of these transactions between the cache controller and the system memory controller consume a portion of the interconnect fabric bandwidth. Additionally the system memory controller bandwidth is also affected by these transactions. A reduction in the number of steps required for the cache controller to acquire and relinquish ownership of the cache line would provide a corresponding improvement to overall system performance.

Data requested and accessed by the cache controller can be one of several types. First, the cache controller request and memory access can be associated with payload data. Payload data consists of a large data transfer so that it is often handled as blocks of 1 to 4 KB of data. A second type of data that can be requested and accessed by the cache controller is control data and is generally smaller in size. This information is typically between 4 and 32 KB and can be accommodated in one cache line for most applications.

In addition to the shared and private memory requests discussed previously, a third type of access to information stored in system memory exists. A "read current" transaction results in the requesting cache controllers receiving coherent data of the cache line at the time of the request but does not affect the ownership of the cache line. A read current transaction guarantees that the information contained within the cache line was up to date at the time the data was obtained from the system memory controller. One of the advantages of a read current request is that, after the device has used the data, the cache controller does not have to relinquish ownership of the cache line since the read current had no effect on the ownership of the cache line within the system. The elimination of this third step in the normal cache controller access of memory location improves the useable bandwidth in the system fabric.

Contentions can arise between two caches which both attempt to obtain ownership of a cache line. Effectively, after the system memory controller has assigned one cache ownership of the cache line, the second cache can request ownership (prior to the first cache's use of the cache line), resulting in the first cache losing ownership of the cache line. Similarly, after the system memory controller assigns ownership of the cache line to the second cache, but before the second cache has used the cache line, the first cache can again request the cache line. In some cases this contention between the requesting caches can result in the cache line "ping-ponging" between the two contending caches. This prevents either device under the two caches from making forward progress. It also results in increased latency for the devices/processors accessing the cache line.

A need currently exists to improve the useable bandwidth for large payload transfers by eliminating one of the three steps in a normal data transfer. Additionally, a further need exists to eliminate the presence of "ping-ponging" which may occur between contending caches.

SUMMARY OF THE INVENTION

These and other objects, features and technical advantages are achieved by a system and method which according to an aspect of the invention, a shared memory providing access to a plurality of agents (e.g., processor, cells of processors, I/O controllers, etc.) includes a memory and a memory controller. The memory controller selectively provides memory access to the agents in both coherent and read current modes of operation. In the coherent mode, the memory controller ensures that an agent's cache reflects the most up to date data. Using, for example, a MESI type protocol, the memory controller limits access to memory so that only one "owner" gets the cache line at any time for write access and that, during the extension of these write privileges, no other agent has a valid copy of the data subject to being updated. Thus, the memory controller implements a first set of rule in the coherent mode of operation to insure that all copies of data stored by the agents are coherent with data stored in the memory. In a read current mode of access, a read-once segment of data is copied to an agent with the agent implementing a second set of rules to eliminate the possibility that the data might become stale prior to use or that it be misused by another agent or process. Thus, in the read current, an "uncontrolled" copy of the data is released subject to certain restrictions to be implemented by the receiving agent as defined by a second set of rules.

According to a feature of the invention, the second set of rules require that the agent's copy of data be provided as an output and then invalidated after use. These rules further require that the uncontrolled data, i.e., the agent's copy, be limited in size and terminate in a predetermined block boundary. These limitations restrict the read current data from causing data corruption including the scenario where the requesting device were to experience a failure such that protection of the data might be compromised.

According to another feature of the invention, the second set of rules require that the copy of data be accessed by an external device in a sequentially incremental fashion and that, upon completion of the transfer, the copy of data be flushed from the host agent's cache. Again, these rules are directed at ensuring that the data is used immediately and not permitted to become stale, and that the data is flushed, i.e., is read once and only once. Another rule implemented by the agents according to the read current protocol is a requirement that detection of an error condition causes the copy of data to be flushed. These errors include, for example, a failure of the requesting agent such that it cannot comply with or implement one or more of the safeguard required to protect this uncontrolled data from misuse.

According to another feature of the invention, different sets of rules, of subsets of rules, are used and applied to provide payload versus control data and traffic. The dichotomy accommodates differences between these data types, include typical sizes and uses of the data.

According to another aspect of the invention, a shared memory providing access to a plurality of agents includes both a memory and a memory controller. The memory controller selectively provides memory access to the agents in both coherent and read current modes of operation. In the coherent mode of operation, the memory controller follows cache coherence protocol in prior art such as the MESI protocol. In the read current mode of operation, the memory controller provides memory access to an agent so that a copy of data stored in the memory is retrieved subject to the agent implementing a set of rules to avoid the data going stale or being misused. The agents may implement theses rules using appropriate control logic.

The read current rules implemented by the agents include:
(i) data supplied in the read current mode of operation is to be sequentially and incrementally transferred by the receiving agent beginning at a starting address through an end of a predetermined block address;
(ii) data supplied in the read current mode of operation is to be flushed by the receiving agent upon completion of a transfer operation;
(iii) data supplied in the read current mode of operation is to be flushed by one of the agents upon detection of a first fault condition;
(iv) data supplied in the read current mode of operation is to be flushed upon an interruption of a transfer of the data;

(v) fetching operations to supply the copy of data are to be terminated upon detection of a second fault condition; and (vi) in response to a third fault condition, fetching operations to supply the copy of data are to be completed through an end of a corresponding DMA block address and the copy of the data is to be flushed.

According to another aspect of the invention, a method of providing memory access to a plurality of agents selectively provides memory access in a coherent and read current mode of operation. A first set of rules, initiated by the controller, ensures that all copies of data stored by the agents are coherent with data stored in the memory. A second set of rules supporting read current memory access are implemented by the agents without controller monitoring and/or intervention so as to provide the agents with read only access to data stored in the memory. Read current procedures implemented by a participating agent include creating a cache copy of data using the read current memory access, transferring to a peripheral device the cache copy of data, and then flushing the cache copy of data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 13 shows a continuation of the flow chart of FIG. 12;

FIG. 14 shows a flow chart for a cache read request;

DETAILED DESCRIPTION

Figure 1:
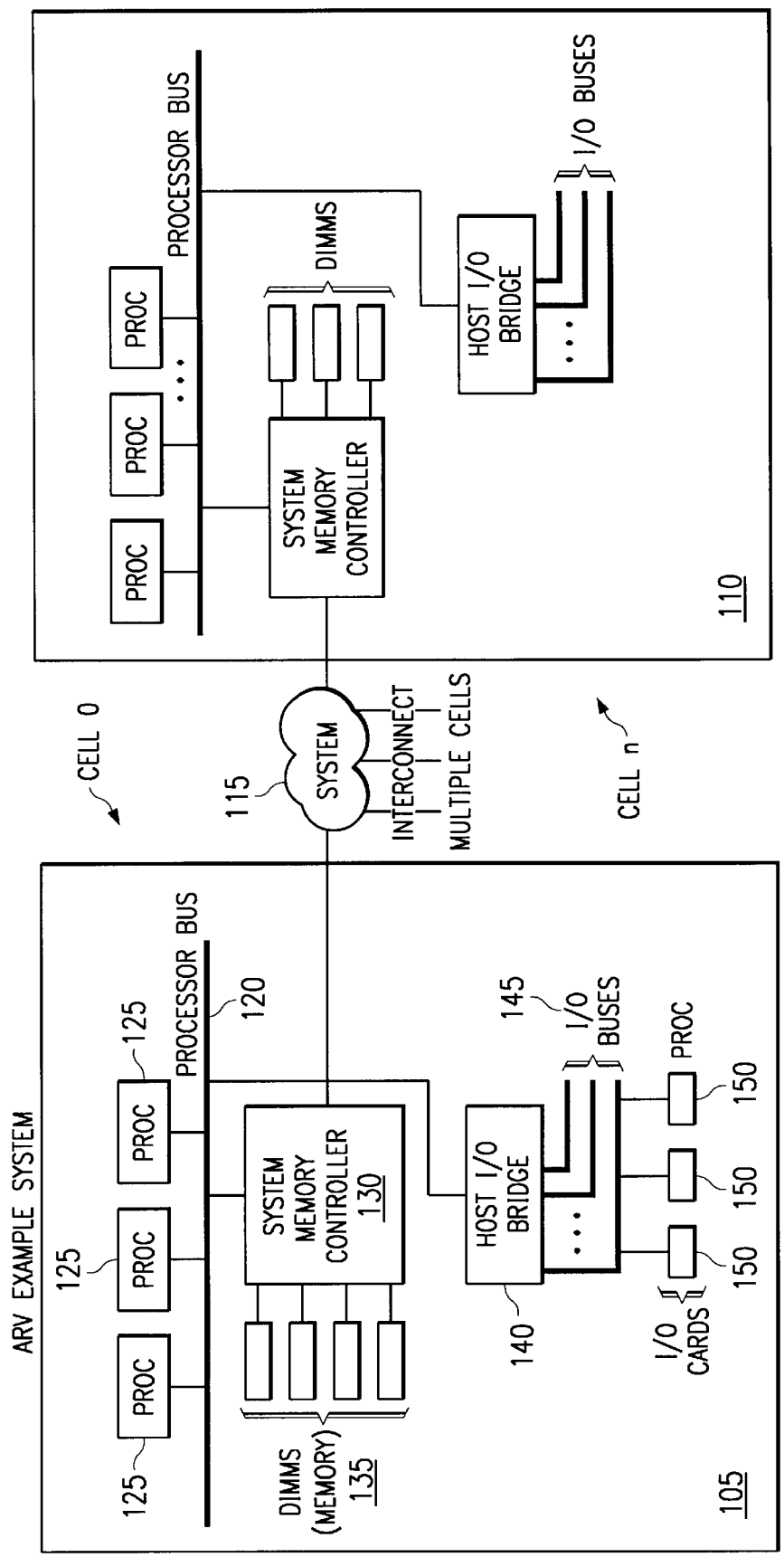
FIG. 1 shows a block diagram of a node consisting of two cells interconnected via a system interconnect.

FIG. 1 is a block diagram of a system incorporating the present invention. The system depicted in FIG. 1 contains cell 0 (105) in communications with, multiple other cells, including diagrammatically represented by cell n (110), and a system interconnect 115 that provides communications between and among the cells. Cell 0 (105) represents a typical cell and consists of the processor bus 120, several processors 125, the system memory controller 130 and the main memory (e.g., in the form of DIMMs)135. Cell 0(105) is a basic building block of a nodal system in which the present invention may be used. The system interconnect 115 can consist of interconnect structure including simple interconnects or multiple chips providing communication between and among cell 105 and the other cells such as 110.

The processor bus 120 connects one or more processor(s) 125 to the system memory controller 130. The system memory controller 130 controls the coherency tasks and may also control activities on the bus including which of the connected components acquires ownership of the processor bus 120. The system memory controller 130's main function is to control access to the main memory of the system or, within cell 0 (105), the DIMMS 135. It should be noted that the DIMMS 135 are but one type of memory, the invention not being limited to the use of any particular storage device, but applicable to any type of main system memory including SRAMs. The main memory, or DIMMs 135 in cell 0 (105), are used to store any system information including, e.g, system, utility and application software, data, configuration files, etc.

Also connected to the processor bus 120 is a host I/O (input/output) bridge 140. The host I/O bridge 140 is the gateway into one or more I/O buses 145. The host I/O bridge 140 controls traffic between the processor bus 120 and the I/O cards 150. Within each I/O bus 145, one or more I/O cards 150 provides the system with external connectivity, i.e., connections to the outside world. These I/O cards 150 provide connections to local and remote peripheral devices including disks (not shown), tape drives (not shown), or any other I/O device. An I/O device is then available to a processor 125 and can access memory 135 through a specific I/O card 150, the respective I/O bus 145 which the I/O card resides within, the host I/O bridge 140, and the processor bus 120.

Overall, the processors 125 of cell 0 (105) perform the required processing, the system memory controller 130 controls all of the coherency actions in the system and the access to the main memory 135, and host I/O bridge 140 controls access between the processor bus 120 and the I/O cards 150 which, in turn, control the flow of data into, or out of, the system.

Figure 2:
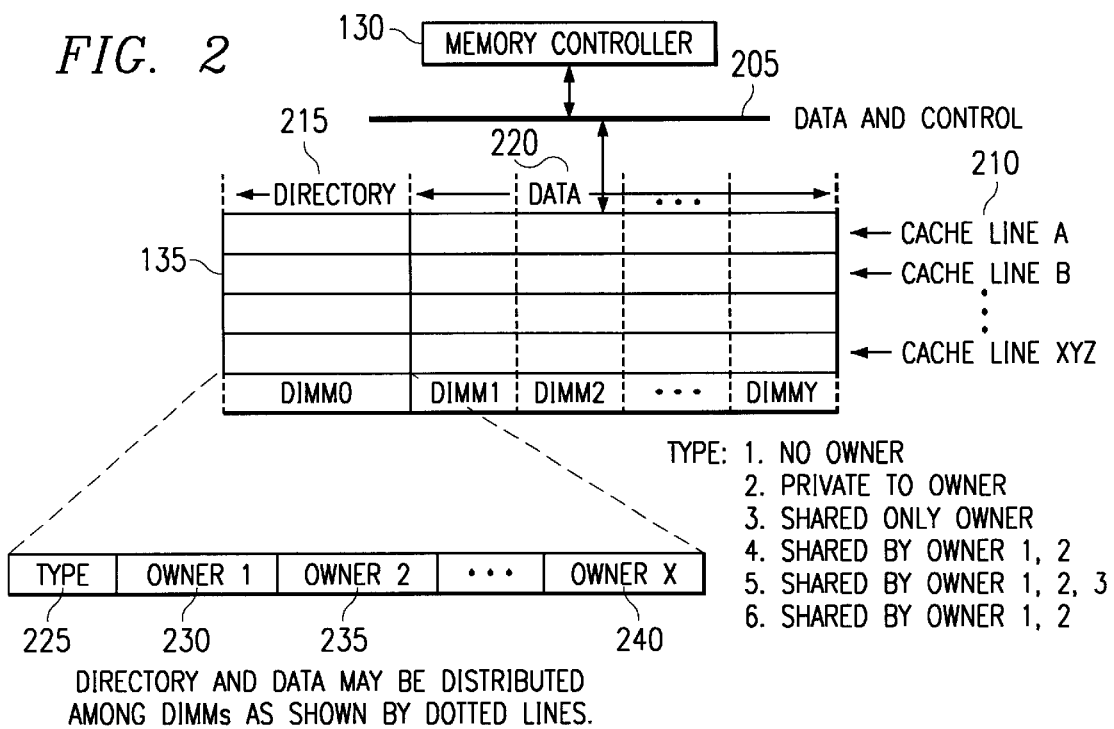
FIG. 2 shows the directory structure of system memory of FIG. 1.

Referring to FIG. 2, the system memory controller 130, also known as the memory controller, uses the address, data and control bus 205 to access main memory 135. Main memory 135 is configured to support a directory based coherency scheme. The main memory 135 may be used to store, as shown in FIG. 2, a table in which each row represents a cache line 210 and each column represents either the directory information 215 or a portion of the data 220. The directory column 215 stores ownership information related to the specific cache line 210. This ownership information includes the format of the information. As shown in FIG. 2, the directory column 215 is subdivided into type information 225, owner 1 information 230, owner 2 information 235, etc. up to and including owner x information 240. The type 225 information may consists of a symbol or other indication representing an ownership attribute of the information, e.g., a 1 indicating that no owner exists, a 2 which indicating that the cache line 210 is privately owned, a 3 indicating that the ownership of the cache line is shared but only has a single shared owner, or a higher number which indicates that the ownership of the cache line is shared and that it currently has more than one owner. In each case, the type information shows the current type of ownership associated with each cache line. The remaining columns 230–240 within the directory 215 column indicates the ownership information of the various possible owners. For example, if the cache line A were owned privately by owner 1, the type column 225 would contain a 2, and the owner 1 column 230 would indicate that owner 1 had private ownership of the cache line. In this case, all of the other columns 235–240, should indicate that no other owner exists. The table structure shown in FIG. 2 is a representative table and is not intended to be restrictive or otherwise limiting of the invention or the environment in which the invention is applicable.: For example, the columns 230–240 could be dedicated to a specific owner and the table entry could contain a checkmark or other flag indicating when a specific owner retains ownership. Alternately, a number of non-dedicated columns 230–240 could be included within the table and the individual cell entries could contain the owner's name or other designation rather than a check mark. In FIG. 2, the type field indicates which of the owners is valid. In this example, cache line A may be of type 2 previously defined indicating th at it is privately owned with owner 1 (field storing the identity of the owner) while cache line B may be of type 3 together with an indication of the identity of the shared owner(s). It should be recognized that cache line A and cache line B are independent. The DIMMS which make up the main memory 135 are divided into a number of cache lines 210, where each cache line is divided among a number of DIMMS. As shown in FIG. 2, DIM0 may contain the directory 215 information, while DIMM 1 through DIMMY may contain the data information associated with a specific cache line 210. As in any coherency system, the basic unit of communication is the cache line for coherency considerations.

Figure 3:
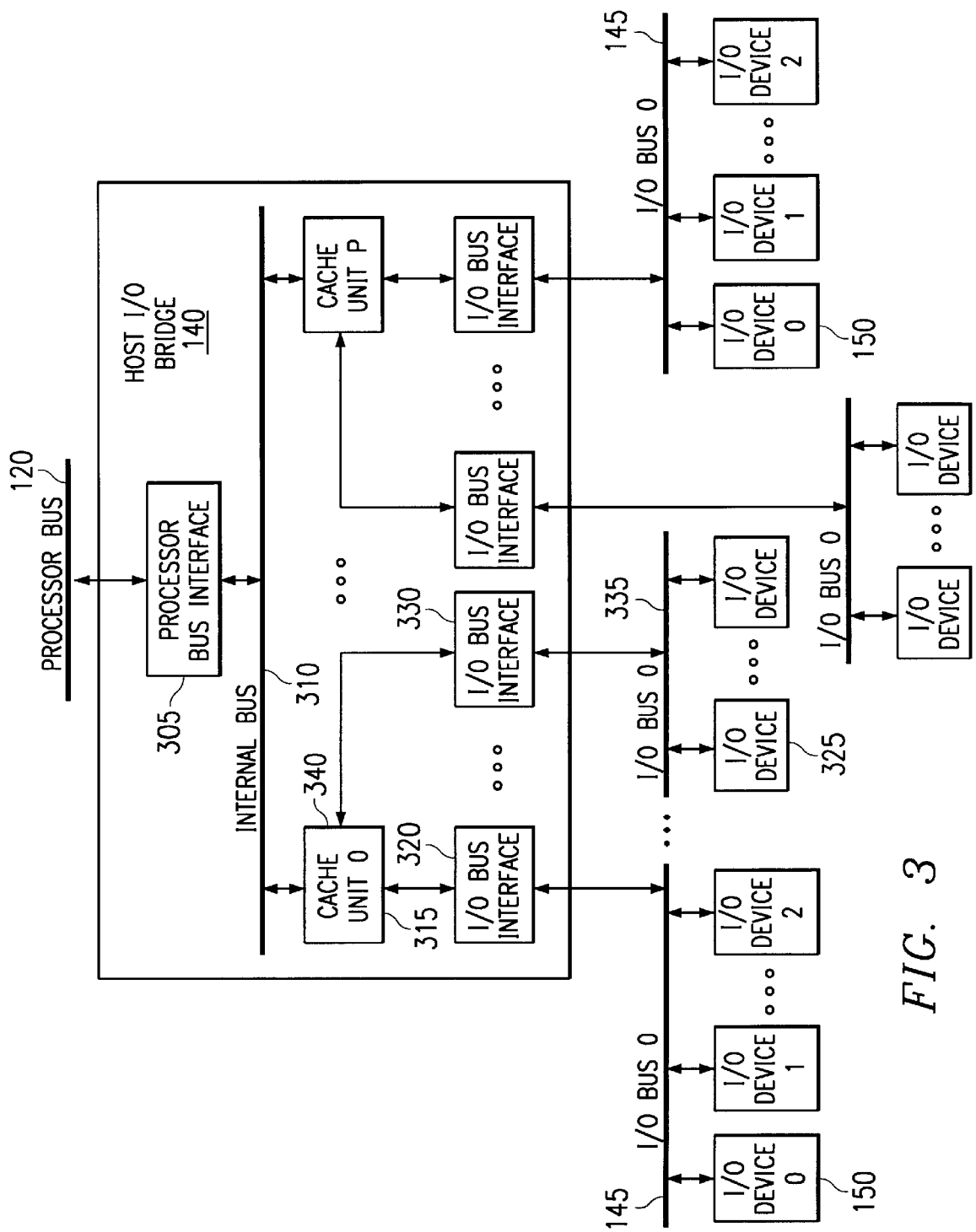
FIG. 3 shows a block diagram of a host input/output bridge subsystem serving multiple input/output buses.

FIG. 3 is a block diagram showing details of a host I/O bridge 140 which services multiple I/Q buses 145. In a cache coherent host I/O bridge, the host I/O bridge 140 performs data transfer through caches. In FIG. 3, processor bus interface 305 communicates with the processor bus 120 and an internal bus 310. The internal bus 310 is connected to one or more cache units 315. Each cache unit 315 contains a cache and associated control logic and interfaces with one or more I/O buses 145. An I/O bus interface 320 is used to interface cache unit. 315 with an I/O bus 145. Each I/O bus 145 can be attached to one or more I/O device(s) 150. Cache unit 315 connects to multiple I/O buses each through a distinct I/O bus interface 320. The I/O bus interface 320 takes a Direct Memory Access (DMA) read request, or DMA write request and forwards it to the appropriate cache unit 315. For example, I/O device 325 connects to the I/O bus interface 330 through the I/O bus 335. The I/O bus interface 330 is connected to cache unit 340 which, in turn, is connected to processor bus interface 305 via internal bus 310 and then to the processor bus 120. From the processor bus 120, a read or write request can be passed to the system memory controller 120 and to main memory 135.

Figure 4:
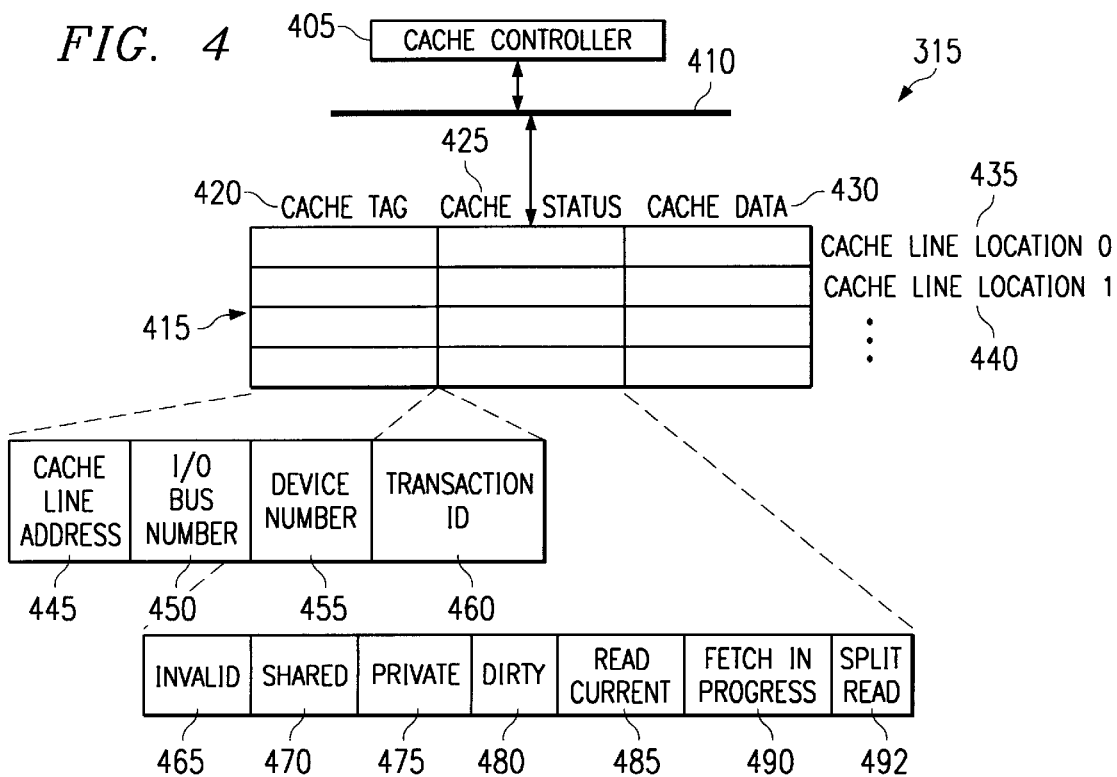
FIG. 4 shows the internal structure of the cache unit of FIG. 3.

FIG. 4 includes further detail of the cache unit 315. Within the cache unit 315 is a cache controller 405, a local bus 410 and cache storage unit 415. The cache storage unit 415 is a storage structure which includes cache tag 420, the cache status 425, and the cache data 430, (e.g., "payload" data).

The cache storage unit 415 is divided into cache lines. Shown in FIG. 4 are cache line location 0 (435) and cache line location 1 (440). Every cache line location has its own cache tag 420, its own cache status 425, and its own cache data 430. A cache line normally 4consists of 64 bytes of data.

The cache tag 420 consists of a cache line address 445, an I/O bus number 450, a device number 455, and a transaction ID 460. While prior art systems normally only included cache line address 445, the present invention farther provides additional fields including I/O bus number 450, device number 455 and transaction ID 460 as part of the cache tag 420. Normally a request for a cache line would include a cache line address, and the requested cache line address would be stored. The 110 bus number 450 is an identifier for the specific I/O bus 145 from which the request was received. Similarly, the device number 455 is an identifier for the specific device 150 which made the cache line request. These two identifiers specify which device made the original request for the cache line. The cache line address 445 is used to determine the cache line boundary. For example, if the byte address is known and the cache line size is 64 byte, then the lower six bits can be ignored resulting in alignment of the 64 bytes. The cache line address would be equal to the remaining portion.

The transaction ID 460 is used for forward looking I/O bus specification such as PCIX or infinity band, or NGIO which are used for split transactions. A split transaction uses a transaction ID to identify the read requests sent by the I/O device 150 of FIG. 3 so that the card does not have to be retried. For example, referring back to FIG. 3, if an 110 device 150 makes a split read request on the I/O bus 145 and that request is forwarded to and accepted by the I/O bus interface 320, that forwards the request to the cache unit 315, the requesting I/O device will not make the same read request. The cache unit 315 should voluntarily give data for the requested read to the requesting I/O device 150 using the transaction ID 460.

Normally, an I/O device 150 makes a read request on an I/O bus 145, which is sent to the I/O bus interface 320 and then sent to the cache unit 315. The I/O device 150's request asks the cache unit 315 to provide the data immediately, and the cache unit 315's cache controller 405 looks to the cache tag 420 to determine if that specific cache line is in use. If the cache line is available and the cache status is alright, the data is supplied right away. If the cache line is not available, the cache controller 405 tells the I/O bus interface 320 to tell the I/O device 150, via the I/O bus 145, to try the read at a later time. In anticipation of I/O device 150's follow up request, the cache unit 315 will request the cache line from the system memory controller 130 through the processor bus interface 305 on the processor bus 120. When the cache line becomes available, the data is brought into the cache unit 315 and will be available when the I/O device 150 makes a subsequent request for the cache line. The I/O device 150 will continue to receive retries until the data becomes available. On a split read the cache controller 405 sends data to the I/O device 150 voluntarily as soon as the cache line data is returned by the system memory controller 130. The data goes out with the transaction ID 460.

Referring back to FIG. 4, the cache status box 425 contains information which represents the status of the specific cache line. The cache status 425 of cache line location 0 (435) will contain status information for cache line location 0 (435). The cache status 425 contains fields for invalid 465, shared 470, private 475, dirty 480, read current 485, fetch in progress 490 and split read 492. The present invention relates to the read current 485 field and the split read 492 fields in the cache status.

The fields for invalid 465, private 475, dirty 480, read current 485, fetch in progress 490 and split read 492 represent the status of the cache line. Invalid, shared, private or dirty represent the set up of the cache line. These fields reflect the ownership of the cache line as far as the system memory controller 130 and the cache controller 405 is concerned and as reflected in the type field 225 and the owner fields 230–240 of FIG. 2. The fetch in progress 490 of FIG. 4 indicates that a cache controller 405 has made a request to the system memory controller 130 of FIG. 1 for this particular cache line address 445. A fetch in progress 490 indicates that request is outstanding and that data will be available shortly.

Figure 5:
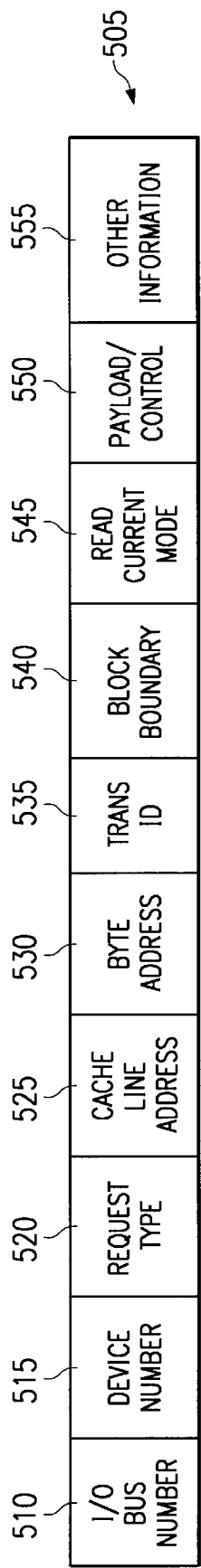
FIG. 5 shows the structure of a direct memory access request presented by the input/output bus interface to the cache unit of FIG. 3.

FIG. 5 shows the fields which are contained in a DMA request 505 which is provided by an I/O bus interface 320 to the cache unit 315 of FIG. 3. These fields include the I/O bus number 510, device number 515, request type 520, cache line address 525, byte address 530, transaction ID 535, block boundary 540, read current mode 545, payload control 550, and other information 555.

The first field, the I/O bus number 510, represents the specific I/O bus (145 of FIG. 3) making the subject cache request. If the I/O bus is the first device or agent making the request for the specific cache line, the I/O bus number 510 will be equal to the I/O bus number 450 of FIG. 4. If another I/O bus (145 of FIG. 4) had made a previous request for the specific cache line, the I/O bus currently requesting the data may also be allowed access to the data if the ownership is not read current and the cache line is valid.

Since each I/O bus (145 of FIG. 3) requires its own I/O bus interface (320 of FIG. 3), the I/O bus number 510 is fixed for each and every I/O bus interface. If a particular cache unit (340 of FIG. 3) has two I/O bus interface (320 of FIG. 3), the two I/O bus interface units will have different identifying numbers.

The second field of DMA request 505 shown in FIG. 5, the device number 515, identifies the requesting I/O device 150 (FIG. 3) in the I/O bus 145 (FIG. 3). This field gives the requestor's device ID number. Each I/O device is assigned a unique identifier. The third field of DMA request 505 is the request type 520 and identifies the specific type of request the requesting device made. Examples include a read request and a write request. The requesting device inserts the address of the data it is requesting in the fourth and fifth fields, the cache line address 525 and the byte address 530, respectively. These two fields represent the entire address of the requested cache line down to the byte level. In a 64 byte cache line, bit number 6 and above represent the cache line address and bit number 5 through 0 will represent the byte address.

The next field, transaction ID 535, holds the transaction ID for split read requests, originates from the I/O device 150 (FIG. 3) and is sent by the I/O bus 145 (FIG. 3). This request is responsible for bringing the cache line requested into the cache unit 315 (FIG. 3).

The remaining fields do not come directly from the I/O bus 145 (FIG. 3), but are generated by the I/O bus interface 320 (FIG. 3). The block boundary 540 is used as a stopping point of a data read. A typical block boundary is I kilobyte (Kb). The block boundary is similar to a commitment boundary point that software provides to the hardware so that the data is read from the starting point to the end of the associated block boundary.

Read current mode field 545 indicates whether a particular DMA read can be requested by the cache unit 315 (FIG. 3) through the system memory controller 130 (FIG. 1) as read current and, if so, whether it can be read as read current graphics or read current DMA. The payload/control field 550, indicates whether the request is for payload data or control data. Other information field 555 contains any additional information (that is not otherwise prohibited) a I/O device 150 (FIG. 3) desires to include in the read request. Fields block boundary 540, read current mode 545, payload/control 550, I/O bus number 510, and device number 515 are all specific to the present invention.

Figure 6:
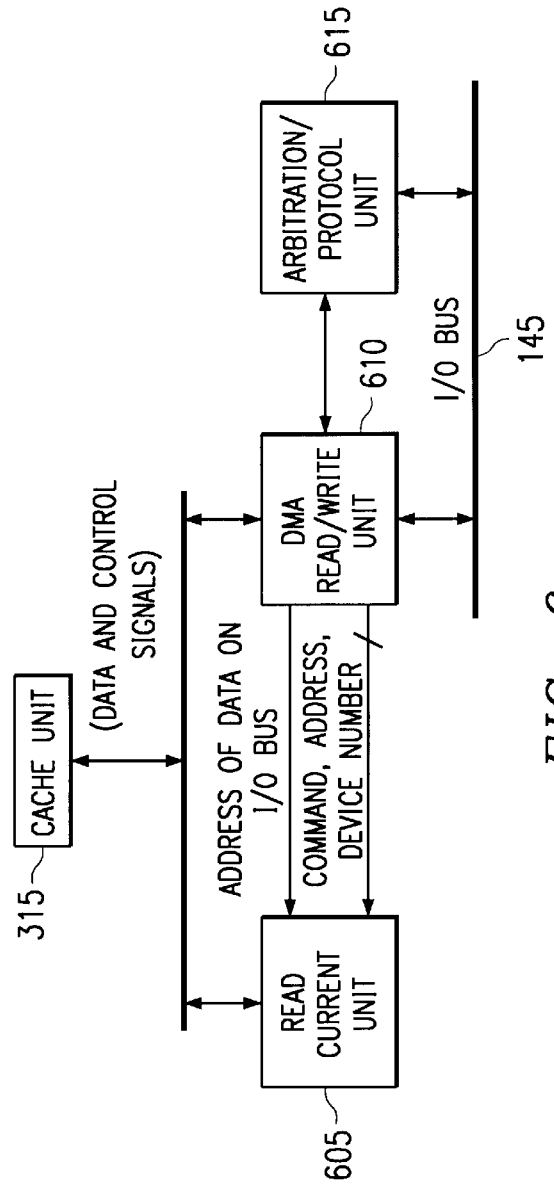
FIG. 6 shows a block diagram of the input/output bus interface of FIG. 3.

FIG. 6 shows the I/O bus interface 320 of FIG. 3 in more detail and its connection with the cache unit 315 (FIG. 3). The I/O bus interface consists of the read current unit 605, the DMA read/write unit 610 and the arbitration/protocol unit 615. The cache unit 315 connects to the read current unit 605 and the DMA read/write unit 610 through a local bus. The DMA read/write unit 610 and the arbitration/protocol unit 615 connect to the I/O bus 145. The arbitration/protocol unit 615 controls all the sideband signals in the I/O bus including which I/O device wins arbitration, is responsible for protocol and communicates closely with DMA read/write unit 610. The DMA read/write unit 610 handles the data as it would flow on the I/O bus during a DMA read or DMA write. The DMA read/write unit 610 also handles any non-DMA transactions. The DMA read/write unit 610 can also be used to queue data before it is transferred to or from the I/O bus 145. DMA read/write unit 610 also controls coordination with the cache unit 315 (FIG. 3).

The DMA read/write unit 610 further communicates with the read current unit 605. The DMA read/write unit 610 passes the byte address of the data that is going on the I/O bus 145 and the address and the device number of new requests to read current unit 605. The read current unit 605 examines this information and implements a set of rules that allows the read current mode to be used in a directory based coherent I/O system. The read current unit 605 implements a portion of these read current rules in connection with the cache unit 315 (FIG. 3) that also implements a portion of the read current rules. The I/O interface of the read current rules are implemented within the read current unit 605. The DMA read/write unit 610 determines and services additional requirements of read/write unit 605.

Figure 7:
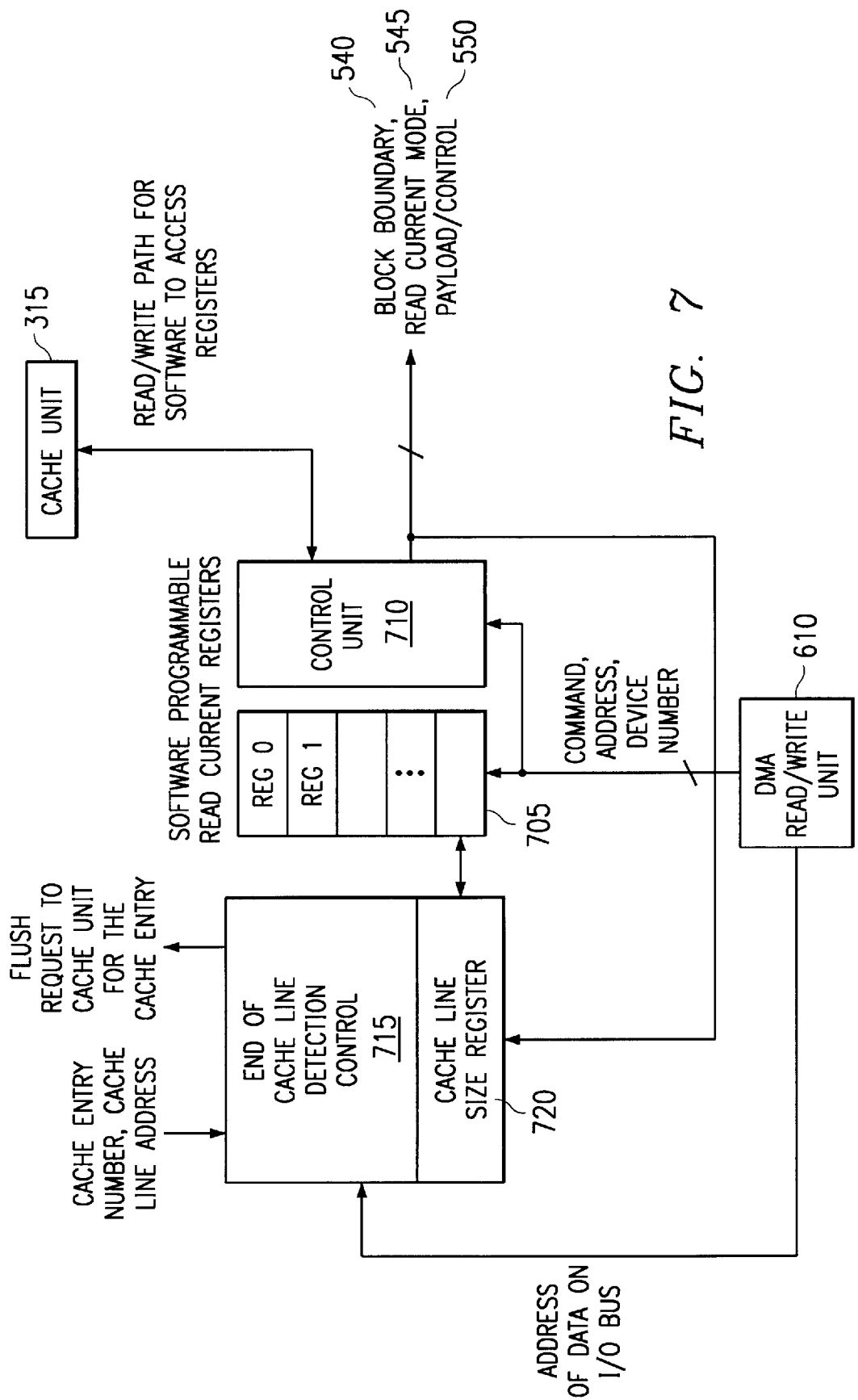
FIG. 7 shows a block diagram of the read current unit of FIG. 6.

FIG. 7 shows read current unit 605 in greater detail. The read current unit 605 includes a number of software programmable read current registers 705, a control unit 710, a end of cache line detection control 715 and a cache line size register 720.

The software programmable read current register 705 consists of a set of registers storing data used to implement the read current solutions of the present invention. The preferred embodiment includes two sets of inputs to the software programmable read current register 705. The DMA read/write unit 610 supplies information pertaining to the command, i.e., the address and the device number related to a new read request. This information also goes to the control unit 710 which determines if a read current transaction is applicable to this request. At approximately the same time, the address and the device number are received by the programmable read current registers 705 and, if a match is found with the information stored in the register, the information is supplied to the control unit 710.

The control unit 710 and software programmable read current registers 705 work together: the control unit 710 determines if the command is a read command; the software programmable read current register 705 determines if the address and device number indicate that the software prefers the use of a read current for this transaction. If both the control unit 710 and the software programmable read current register 705 determine that a read current transaction is preferred, the control unit will release the block boundary information. The block boundary information is supplied by the software programmable read current registers 705 and indicates that the software has guaranteed that reads will not exceed a particular block boundary. The control unit 710 determines the type of read current data desired, i.e., graphics or DMA read current. Once this determination is made, the control unit 710 determines the classification of the transaction including whether or not read current is warranted and, if read current is warranted, whether it should be DMA or graphics read current. The control unit 710 supplies the block boundary 540, the read current mode 545 and the payload cache control 550.

The control unit 710 also receives read/write path for software to access registers from the cache unit 315. This information is used to provide access information so that software can read and write to the appropriate register. For example, if software wants to read or write to this register it sends a read or write command that flows through the processor 120 (FIG. 1), through the processor interface 305 (FIG. 3), through the internal bus 310 (FIG. 3), to the cache unit 315 (FIG. 3), and then to the control unit 710.

Whenever a read current occurs, the end of the cache line detection control 715 reads the block boundary 545, read current mode 545, and payload/control 550 from the DMA request and address and I/O bus data from the DMA read/write unit 605 (FIG. 6)

For example, if a read data is served in the I/O bus 145, the byte address is sent to end of cache line detection control 715 by DMA read/write unit 610. This information is used to determine if the cache unit 315 (FIG. 3) should be instructed to flush the particular cache entry from which data is being served. In case of control read the unit 715 also flushes the cache as soon as the transaction terminates or the end of cache line goes out on the I/O bus 145.

Figure 8:
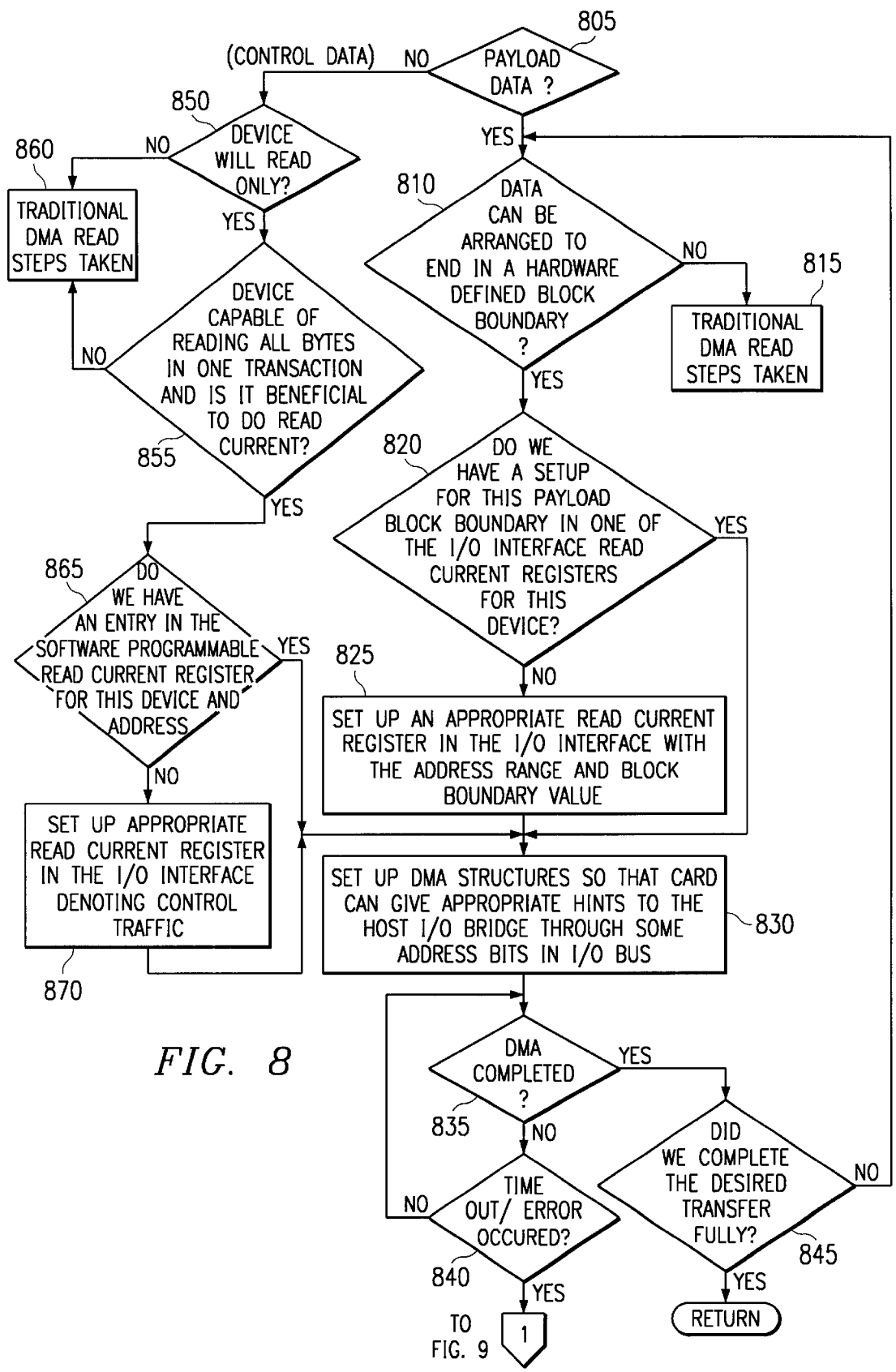
FIG. 8 shows a flow diagram for a software read for outbound direct memory access.

The flow chart of FIG. 8 shows how the present invention determines whether read current should be used for a specific DMA. Prior to Step 805, a DMA request has been made such that it may be possible to use a read current transaction to implement the DMA. Step 805 determines if the data being requested is payload or control data. If the data requested represents payload data, typically, more than a cache line amount of data is being transferred. Conversely, control data is expected to be contained within only one or two cache lines. Step 810 determines if the data can be arranged to end in a hardware defined block boundary. In this case, the hardware determines that a read can only be made to the end of a defined block boundary. Block boundaries can occur at 512 bytes, 1 Kb, 2 Kb, 4 Kb of similar power of 2 intervals. This boundary represents a design choice that has been made during the design of the system. Asked differently, the decision here reflects whether the data being accessed can be arranged to end in a hardware defined block boundary. For example, if the block boundary is 1 Kb and the DMA is attempting to access 1.5 KB which begins at location 0, the first 1 Kb can be accessed using read current transactions. If the answer to this question is "no," the read current cannot be used and a traditional DMA read must be used in Step 815.

In Step 820, the system determines if a setup is available for this payload block boundary in one of the I/O interfaces' read current registers (705 of FIG. 7), i.e., whether it is possible to use read current for this transaction. If a setup is not already available, Step 825 causes an appropriate read current register to be setup in the I/O interface with the appropriate address range, block boundary value, and device ID. Software programmable read current register in block 705 (FIG. 7) can be dynamically modified to allow the use of read current.

Using the payload block boundary, Step 830 sets up the appropriate DMA structure so that the requesting I/O device 150 (FIG. 3) can perform the appropriate steps to use read current for this memory access on I/O bus 145. Step 830 may involve a number of subordinate or supporting steps which set up the structure required by the software. Step 830 sets up all of the data, and probes the requesting device and instructs it to perform a DMA. The I/O device 150 (FIG. 3) will begin a DMA read at the conclusion of Step 830. Step 835 checks for the completion of the DMA read and, upon its completion, the transfer is checked in Step 845. This DMA read check can be accomplished in several ways including the use of a dedicated circuit. If the DMA is not completed, software can implement a time out/error condition which will transfer control to perform processing depicted in the flow chart to FIG. 9 for correction of the error condition.

For example, if a transfer included data from 0 to 1.5 kilobytes and a 1 Kb block boundary was used, two blocks of data can be read. The first read will access information from 0 to 1 Kb and Step 845 will determine that not all of the information has been transferred. Accordingly, Step 845 would return to Step 810 so the remaining information from 1 to 1.5 KB can be transferred. The remaining information is examined to determine if the remaining data can be rearranged in the hardware to end on a block boundary. If a block boundary of 512 bytes were used, the remaining information may be transferred via read current transactions too.

Returning to Step 805, if the data being accessed does represent payload data, but instead consisted of control data, the typical characteristics of such data indicate that only a relatively small chunk of data will be involved in the transfer. Typically, the size of this data is 4 bytes, 8 bytes, or 16 bytes, and the data is typically contained in a single cache line. Step 850 determines if device 150 will access this control data as read only. If the device 150 requires write access to the data, Step 860 initiates traditional DMA read steps necessary to complete the transfer. If, however, the device will only read the data, Step 855 determines if a single transaction can be used to read all of the requested control information bytes and if the use of a read current transaction would be beneficial. If the answer to either of these questions is "no" flow continues to Step 860 and traditional DMA read steps are taken. If the control data can be accessed in a single transaction and if the use of the read current would be beneficial, Step 865 determines if an entry is available in the software programmable read current register 705 (FIG. 7). If an entry is available it is used for the read current transaction (similar to Step 820) and if one is not available, Step 870 attempts to set up an appropriate read current register in the I/O interface control traffic dynamically.

Since control data is limited in size, block boundaries are not used with control data. Instead of block boundaries, the information obtained from the software programmable read current register consists of checkup information specific to the control data and the I/O interface readings. This prevents hardware from prefetching data.

Figure 9:
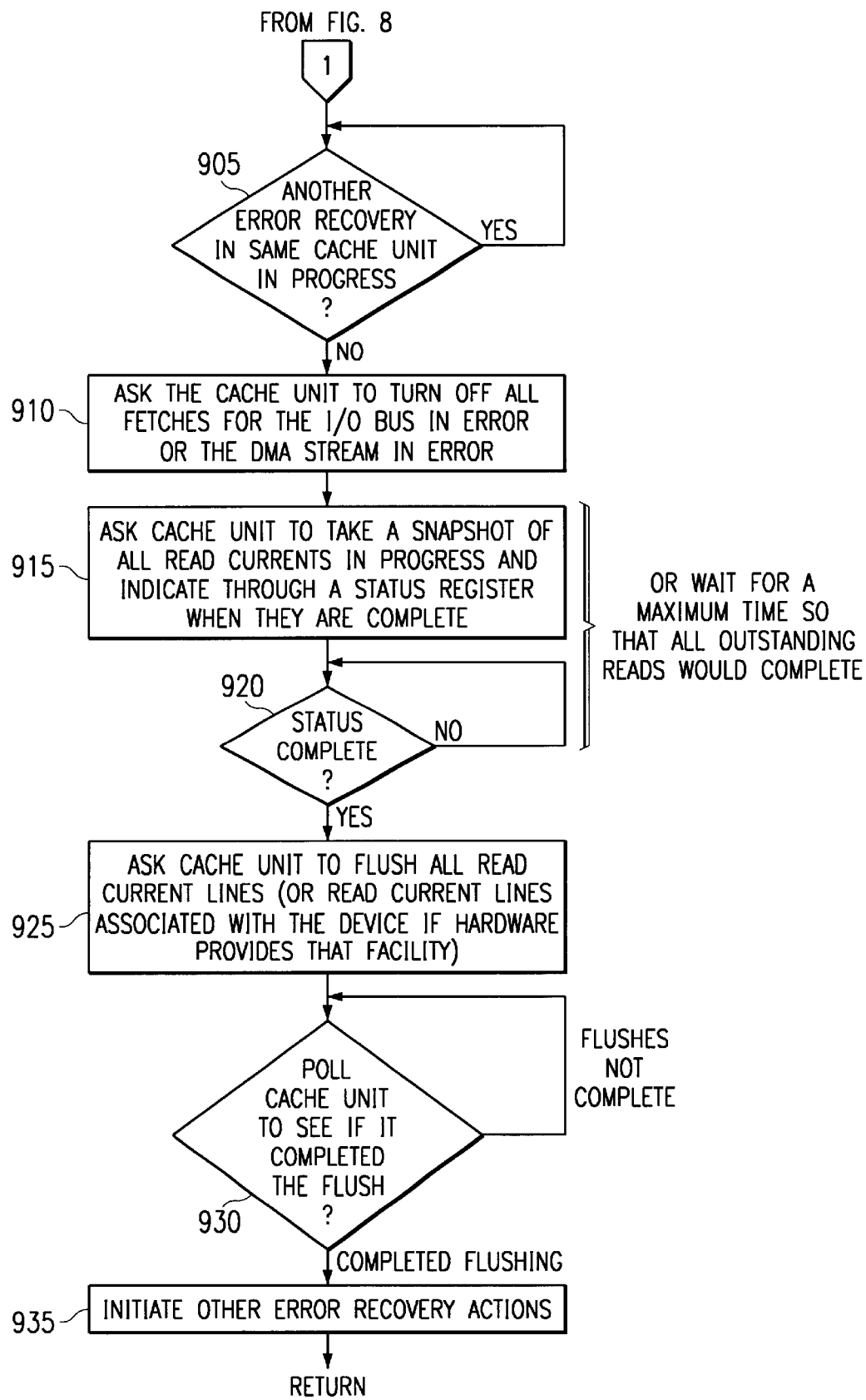
FIG. 9 shows a continuation of the flow diagram of FIG. 8.

FIG. 9 details the error scenarios which might occur during transitions within the processing detailed in FIG. 8. Processing depicted in FIG. 9 addresses rules pertaining to cleanup operations if an error occurs. At Step 905, a determination is made concerning the presence of additional error recovery processes in the same cache unit which are in process. This processing assumes the associated hardware can only handle a single error at a time. If the answer in Step 905 is "yes," a delay is introduced by returning the flow to Step 905 until the hardware can handle the error recovery. If, however, the answer is a "no," and another error recovery is not in progress in the same cache unit, then Step 910 requests the cache unit to turn off all associated fetches for the I/O bus 145 (FIG. 3) containing the error or from the affected DMA. This implementation is hardware dependent. Once the associated fetches have been eliminated, Step 915 asks the cache unit to take a snapshot of each of the read currents currently in progress and to track the read currents until they are complete. This step attempts to complete all read currents associated with the error. A request is made to the cache unit to desist from requesting any additional cache lines as read current associated with the specific device that had the error. The snapshot is used to track outstanding read currents through completion. Once the read currents are completed as determined in Step 920, a request is made to the cache unit 315 (FIG. 3) to flush all of the read current lines associated with the device which contained the error. If the status in Step 920 has not completed, the system waits until the status is completed. The functionality of Steps 915 and 920 can alternatively be incorporated with a wait state which exceeds the maximum time associated with the time required for a read current. This system wait would replace Steps 915 and 920.

Steps 910 and 915 authorized the cache unit 315 (FIG. 3) to stop issuing any new requests for the specific device which has an error. Step 915 and 920 ensure that any outstanding read current requests that the cache unit 315 (FIG. 3) made are completed and no longer pending. Step 925 requests the cache unit 315 (FIG. 3) to flush all the read current lines which contain data from the read request which encountered the error. This step ensures the data is not inadvertently read by a different I/O device 150 (FIG. 3). This step also ensures the elimination of all of the read currents that are associated with the DMA that has timed out in FIG. 8, box number 840.

In Step 930, the cache unit 315 (FIG. 3) is polled to determine if the flush initiated at Step 925 has been completed. If the flush has not completed, the polling continues until the flush is completed. Once the flush has completed and all of the read current lines are empty, the system initiates other error recovery actions in Step 935.

Figure 10:
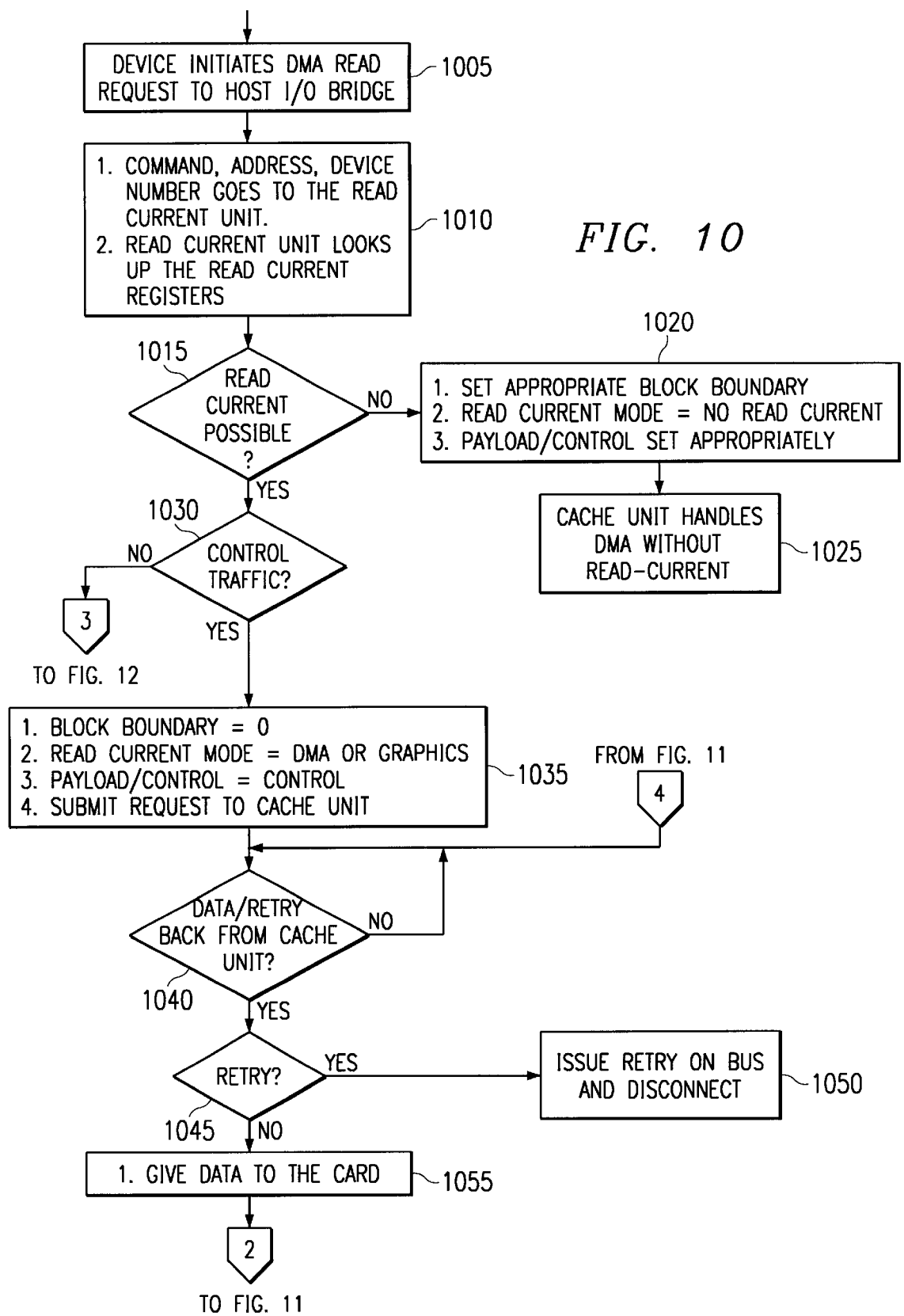
FIG. 10 shows a flow chart for the hardware used in the implementation of the input/output bus interface.

FIG. 10 shows processing performed by the hardware I/O bus interface 320 (FIG. 3). FIGS. 8 and 9 have described a set of rules which are implemented in software to recover from an error condition associated with the use of read current. FIG. 10 presents the rules to be followed by hardware in the form of a flow chart. At Step 1005 the device initiates a DMA read request to the host I/O bridge 140 (FIG. 1). I/O device 150 (FIG. 1) requests access to a cache line, which the I/O bus 145 (FIG. 1) forwards to the host I/O bridge 140 and specifically to the I/O bus interface 320 (FIG. 3) inside the host I/O bridge 140.

When the read request is received, Step 1010 gathers the command, address, and it device number and sends the information to the read current unit 605 (FIG. 6). The read current unit 605 accesses the software programmable read current register 705 (FIG. 7) with the command, address and device number provided by the DMA read/write unit 610 (FIG. 7) in the second step of Step 1010. At Step 1015, using the software programmable read current registers 705 and the control unit 710, a decision is made whether read current is possible based on information that was collected at Step 1010. If a determination is made that read current is not possible, Step 1020 sets an appropriate block boundary, sets the read current mode to no read current and sets the payload/control field appropriately. Once these steps are accomplished, the cache unit handles the DMA without read current at Step 1025.

Returning to Step 1015, if software programmable read current registers 705 and the control unit 710 determine that read current is possible, processing flow continues to Step 1030. If control traffic is involved, as determined by software programmable read current registers 705 and the control unit 710, Step 1035 is used to set the control traffic block boundary to 0. This ensures no prefetch is done by the cache unit 315. Additionally, the read current mode is set to DMA or graphics read current (from Step 705 of FIG. 7), the payload/control field is set to control and the request is submitted to the cache unit 315 (FIG. 3). In this case, prefetches will not be used. The information used in Step 1035 is obtained from block boundary 540, read current mode 545 and payload/control 550 as shown in FIG. 7.

Step 1040 determines if the data or the current retry has returned from the cache unit 315 (FIG. 3). This is where the I/O interface 320 is looking for something from the cache unit 315. In Step 1040, read requests are sent to the cache unit 315, and Step 1040 is awaiting a report from the cache unit 315. The cache unit 315 should return the data or a retry request. In Step 1045, if the cache unit 315 has not responded, a determination is made whether a retry should be attempted. If a retry should be attempted, Step 1050 issues the retry on the bus, disconnects and waits for the cache unit 315 to return the data. If a retry should not be attempted, the data is given to the requesting I/O card or device 150 (FIG. 3) and the flow continues in FIG. 11. The no answer ensures the control data is given to the I/O cards/devices. Step 1055 is executed by the DMA read/write unit 610 (FIG. 7).

Figures 11, 12:
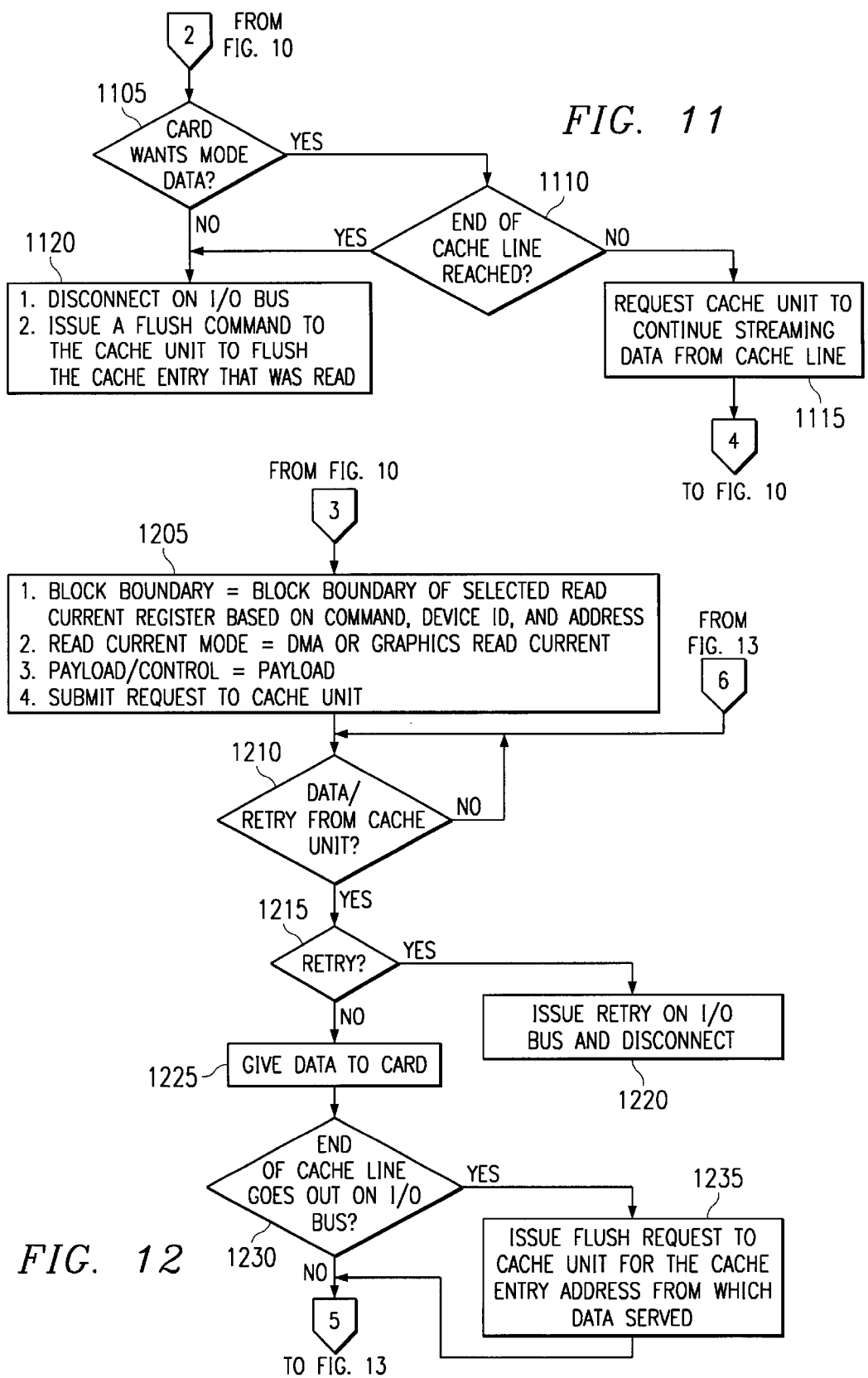
FIG. 11 shows a continuation of the flow chart of FIG. 10.
FIG. 12 shows a continuation of the flow chart of FIG. 10 for non-control traffic.

Returning to Step 1030 of FIG. 10, if the data does not involve control traffic, then payload data is being requested and FIG. 12 shows the resulting flow.

Step 1055 of FIG. 10 is connected to Step 1105 of FIG. 11 which determines if the I/O card 150 (FIG. 1) which requested the data requires more data when the request type is a control read. The DMA read/write unit 610 (FIG. 6) of the I/O bus interface 320 (FIG. 3) handles this decision. The DMA read/write unit 610 works with the arbitration/protocol unit 615 to make this decision. If the card requires more data, Step 1110 is encountered. In Step 1110, a determination is made concerning whether the end of the cache line has been reached. Within Step 1110, a read current request has been made involving control traffic. If this question is answered with a no, Step 1115 sends a request to cache unit 315 (FIG. 3) to continue streaming data from the cache line. This is accomplished through a DMA read/write unit 610 (FIG. 7). This request ensures that more data will be received from the same cache line.

If, however, either the end of the cache line has been reached in Step 1110, or the I/O device or card 150 (FIG. 1) does not require additional data (since it has received all of the data), Step 1120 disconnects the I/O bus 145 (FIG. 3) by use of the DMA read/write unit 610 and the arbitration/protocol unit 615 (FIG. 6) and issues a flush command from the read current unit 605 (FIG. 6) to the cache unit to flush the particular cache entry that was read.

FIG. 12 shows a flow chart of processing used when read current is possible for payload data. In Step 1205, the block boundary is set equal to the block boundary of the selected read current register in the software programmable read current registers 705 based on the command device ID and address that was provided by the DMA read/write unit 610. Step 1205 receives the block boundary 540 (FIG. 7) data from the control unit 710 (FIG. 7). Then the read current mode is set equal to the DMA or GRAPHIC read current and is determined by the software programmable read current registers 705. The payload/control field is set equal to payload and is derived from the control unit 710 (FIG. 7). Finally, within Step 1205, this DMA request 505 (FIG. 5) is submitted on behalf of the I/O bus interface 320 (FIG. 3). The I/O bus interface 320 submits a DMA read request 505 (FIG. 5) to cache unit 301.

Step 1210 determines if the data or the current retry has returned from the cache unit 315 (FIG. 3). This is where the I/O interface 320 (FIG. 3) is looking for something from the cache unit 315 (FIG. 3). In Step 1210, read requests are sent to the cache unit 315 (FIG. 3), and Step 1210 is awaiting a report from the cache unit 315 (FIG. 3). The cache unit 315 (FIG. 3) should return the data or a retry request. In Step 1215 if the cache unit 315 has not responded, a determination is made as to whether a retry should be attempted. If a retry should be attempted, Step 1220 issues the retry on the bus and disconnects and waits for the cache unit 315 to return the data. If a retry should not be attempted, the data is given to the requesting I/O card or device 150 (FIG. 3) and Step 1230 is encountered. The no answer ensures the payload data is given to the I/O cards/devices. Step 1220 is executed by the DMA read/write unit 610 (FIG. 7).

If the answer is no at to Step 1215 then Step 1225 gives data to the cards. If a retry is not being attempted, cache unit 315 (FIG. 3) gave up the data. In that case data is supplied to the I/O cards and Step 1230 is used to determine if the end of the cache line has been reached. Step 1230 is monitored by the read current unit 605 based on the input from the DMA read/write unit 610 to the address of data on I/O bus 145.

Returning to Step 1230, if the end of the cache line has gone out on the I/O bus, then Step 1235 issues a flush request to the cache unit 315 (FIG. 3) for the cache entry address from which data served. Step 1235 is performed in response to the end of cache line detection control 715 (FIG. 7).

Still referring to Step 1230, if the end of the cache line has not gone out on the I/O bus, control is transferred Step 1305 of FIG. 13. Returning to Step 1210 Step 1310 of FIG. 13 transfers control of the flow into Step 1210.

FIG. 13 starts with the flow originating from FIG. 12 and determines in Step 1305 if data is still being provided to the I/O bus 145 and is being read by an I/O device/card 150. In that point, especially with payload data, read current connections have been requested. Step 1305 requests the cache unit to continue streaming the data in Step 1310 and flow is continued at Step 1210 of FIG. 12. The I/O bus interface 320, specifically the DMA read/write unit 610 determines whether there is more data to be transferred. If the answer in Step 1305 is no, then Step 1315 disconnects the I/O device/card 150 (FIG. 3).

FIG. 14 shows the hardware associated with a read request for the cache unit 315 (FIG. 3). Step 1405 receives a read request from the I/O bus interface 320 (FIG. 3). This is where the cache unit 315 receives the read request from the I/O bus interface 320, and a handoff occurs. For example, from Step 1205 (FIG. 12), a wait can be encounter before entering Step 1210. Once a read request is received from I/O bus interface 320, the cache unit 315 is coordinated with the cache controller block with reference to the cache storage block 415 (FIG. 4). So the cache controller block 405 and the storage unit 415 are used to coordinate the cache unit 315 and the cache controller 405 examines the storage unit to assure this coordination. Step 1410 is executed when a cache line address that has been provided by the I/O bus interface 320 (FIG. 3) in the form of the cache line address 525 of the DMA read request 505 (FIG. 5). If that cache line address 525 equal to the cache tag 420. If any of my cache lines contain the address in the cache tag 420 Step 1410 will be true and the flow will pass to FIG. 15.

If, however, the cache line address is not in the cache tag, the answer in Step 1410 is then no, and Step 1415 is encountered. Step 1415 identifies and makes room for a cache entry to be used by the read request. In other words, in Step 1415 an I/O device 150 is requesting to read a particular cache line that does not exist in my cache unit 315. In Step 1415, the cache unit 315 identifies the cache line and makes room for the storage of that particular cache entry. In order to do this, the cache line location needs to be identified for the ultimate storage of the cache line.

In Step 1420, the cache line address, the I/O bus number, the device number and the transaction ID are stored in the tag unit. This output comes from the control unit 710 (FIG. 7), and appears in the form of the DMA read 505 (FIG. 5) and will end up in the cache tag 420 (FIG. 4).

In Step 1425, a determination is made as to whether the read current mode is on. If the DMA read current or graphic read current are enabled, the yes branch is followed from Step 1425 with processing continuing at Step 1440. If no read current is enabled, the no path is be followed to Step 1430. At Step 1430, the cache line is requested as read shared and invalid is set to 1, share is set to 1, private is set to 0, dirty is set to 0, read current is set to 0 because read current is not requested and fetch in progress is set to 1. This processing establishes the cache line as shared. The request goes from cache unit 315 (FIG. 3) via is the internal bus 310 and processor bus interface 305 and processor bus 120 to the system memory controller. The system memory controller then follows the normal cache coherency protocol to provide the requested data.

Referring again to the cache status 425, a value of 1 means that, as in the instant situation, 1 because the access that a split read is being used. If the access were not a split read access, this value would be a 0.

Referring again to Step 1425, if read current mode were on, Step 1440 would be encountered and the request cache line would be read from the system memory controller as read current. In this case, invalid equals 1, share equals 0, private equals 0, dirty equals 0, read current equals 1, fetch in progress equals 1 and split read equals 0.

From either Step 1440 or Step 1430, Step 1435 is next encountered. In either case, within Step 1435, a retry is transmitted to the I/O bus interface 320 (FIG. 3). This retry will try to access the device at a later time. From Step 1435, flow continues at Step 1605 of FIG. 16 where prefetch processing is performed.

Figure 15:
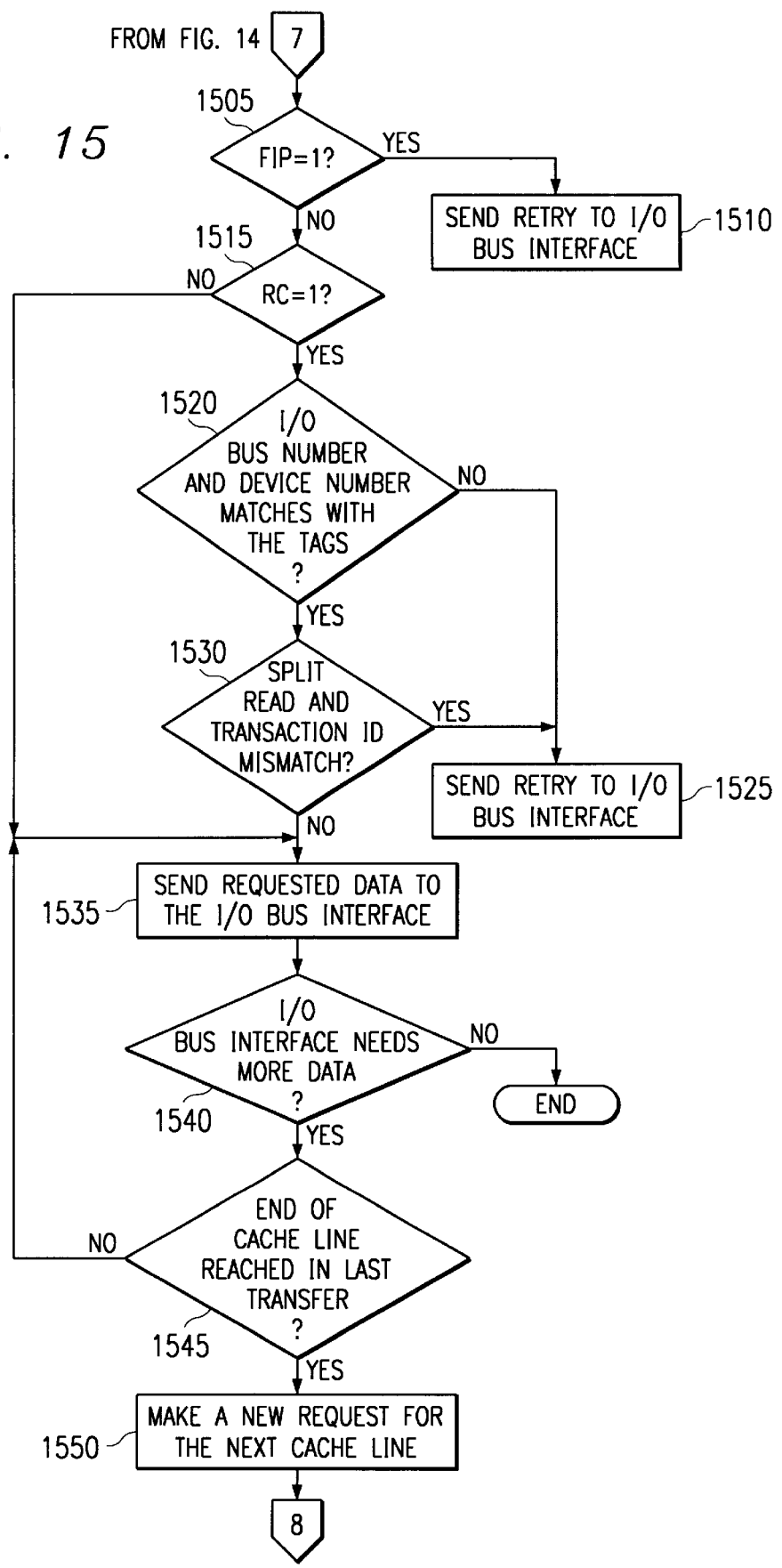
FIG. 15 shows a flow chart of a cache read request.

Referring back to Step 1410, if the cache line address is in the cache tag, processing continues at Step 1505 of FIG. 15. Upon answering yes to Step 1410 in FIG. 14. This means that a cache line address is in the cache tag as described in cache line address 525 (FIG. 5) and cache line address 445 in the cache tag 420 (FIG. 4). Step 1505 asks if the fetch in progress is equal to 1. To determine the answer, the fetch in progress 490 of the cache status 425 is examined (FIG. 4). Fetch in progress is interpreted as "is a the cache line still outstanding as far as an item that was requested with respect to the cache line?" If fetch in progress is true (yes), Step 1510 sends the retry request to the I/O bus interface 320 (FIG. 3). If a fetch is not in progress, the answer in Step 1505 is no, and Step 1515 is encountered where a determination is made as to weather the read current is equal to 1. In other words, has the pending I/O been requested as read current? If the cache line has been requested as read current, the answer is yes and Step 1520 is encountered. In Step 1520 a determination is made as to whether the I/O bus number and device number matches with the tag that has been provided by DMA read request 505 (FIG. 5). In other words does the I/O bus number 450 match with the I/O bus number in 510 and does the device number 455 match with the device number in 550?

Referring again to Step 1515, the read current was not equal to 1, control is transferred to Step 1535.

In summary, the determinations made by the processing shown in this flow chart are attempting to determine if the same device in the same I/O bus for which a particular cache line has been accessed as read current is the same device as is making the current request. This determination is represented in Step 1520.

If, in Step 1520, the answer is a no, Step 1525 sends a retry to I/O bus interface 320. Step 1525 represents a cache line for which another I/O device 150 has requested the cache line as a read current and a subsequent I/O device 150 cannot access this particular cache line.

If instead, the answer at Step 1520 is a yes then, in Step 1530 a determination is made concerning whether the split read and transaction ID are matched or not. If the cache access is a split read, then the I/O bus number, the device number, and the transaction ID must match to determine that the same I/O device is trying to access the cache line. If these items don't match, Step 1535 is encountered and a send requested data to the I/O bus interface is performed. If a split read is not present, the I/O bus number and the device number match with the information contained in the information contained in the cache tag 420. If a split read is present then the transaction identifier must also be checked to determine the outcome of Step 1530. The transaction ID will match if transaction ID 535 (FIG. 5) matches the transaction ID 460 (FIG. 4).

Referring back to Step 1530, if the answer is a yes and everything matches, processing continues at Step 1525 and a retry is sent to the I/O bus interface. Since the same device and the same I/O bus number are involved, but a different transaction ID is present, no data is transferred.

From Step 1535, after the request for the data has been sent to the I/O bus interface, Step 1540 is encountered. In Step 1540, a determination is made concerning whether the I/O bus interface needs more data. If the answer to this question is no, the transaction terminates.

If, however, the I/O bus interface needs more data, then, in Step 1545, a determination is made as to whether the end of the cache line has been reached with the last transfer. If the answer is "yes" then Step 1550 is encountered and a new request for the next cache line is made. In this case, a write address occurred and the cache line address is given to the next cache line address and is no longer in the previous cache line address. This flushes the data. If, however, the answer at Step 1550 is no, then the flow is returned to Step 1535 and the requested data is sent to the I/O bus interface again. This loop will ensure that additional data is accessed until the end of the cache line is reached.

Figure 16:
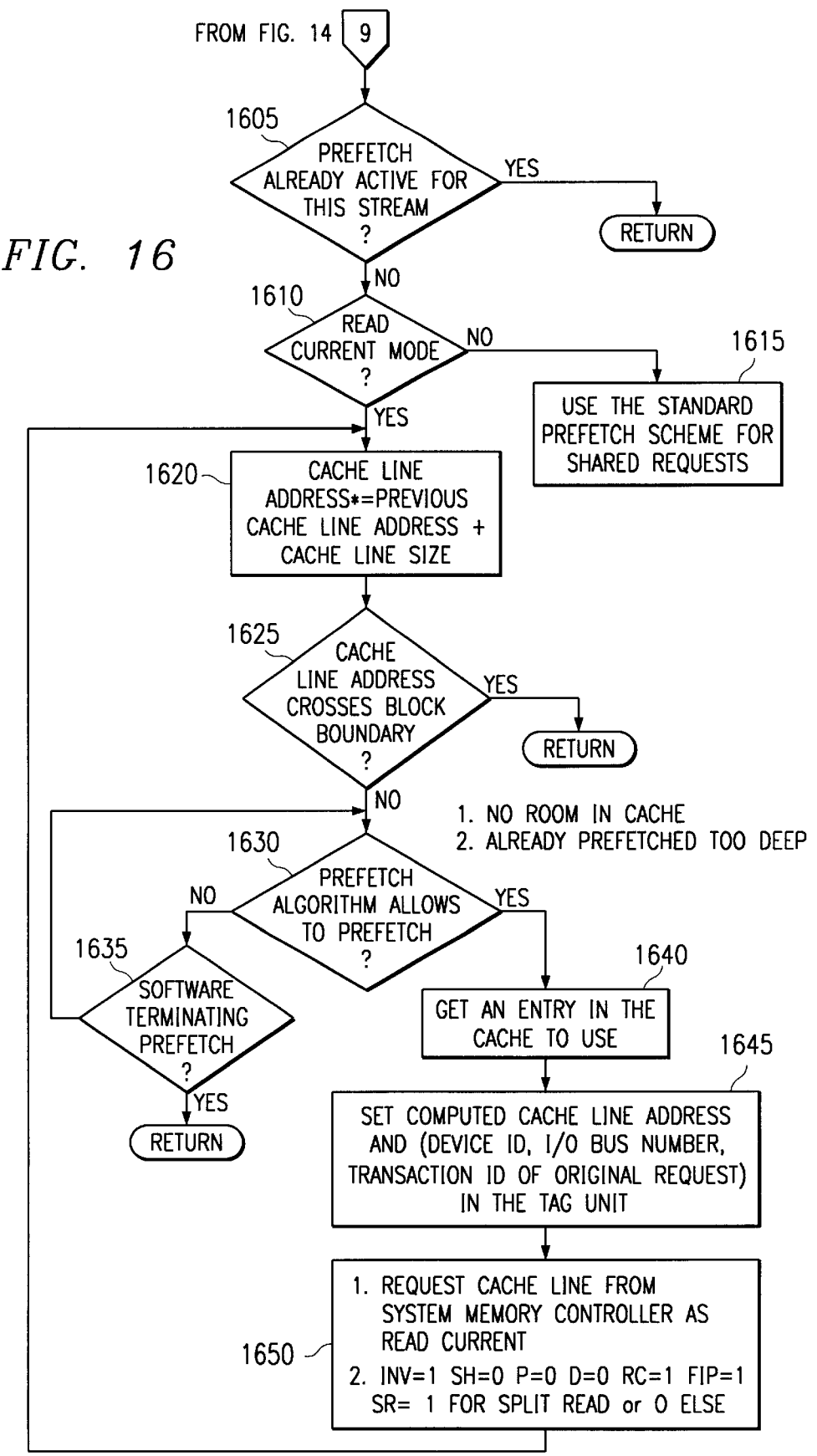
FIG. 16 shows a flow chart for prefetch by a cache controller.

FIG. 16 shows a flow for a prefetch by a cache controller. In Step 1605 a determination is made whether a prefetch is already active for this stream. If the answer is yes, a return to the calling routine is encountered. If a prefetch stream is already active, it is undesirable to have a second prefetch active for the same stream. If the answer is no, Step 1610 is used to determine if read current mode is active. If read current mode is not active, Step 1615 allows the standard prefetch scheme for shared requests be used.

If read current mode is active in Step 1610, Step 1620 is encountered and a determination is made concerning whether the cache line address is equal to the previous cache line address (which was stored in cache line address 525 of FIG. 5) plus the cache line size. For example, if the original request was at 0, and the cache line size is 64 bytes, then the first time Step 1620 is encountered, the cache line address is equal to 64 bytes. Once this calculation is made, Step 1625 is used to determine if the cache line address crosses the block boundary. The block boundary is supplied in block boundary 540 of FIG. 5 and block boundary 540 from control unit 710 of FIG. 7. If the cache line address does cross the block boundary, no action is taken because either there is no room left in the cache or the prefetch is already too deep. As previously discussed, hardware must guarantee that it does not initiate a prefetch beyond a block boundary.

If, in Step 1625, the cache line address does not cross the block boundary, the answer is no and Step 1630 is encountered. In Step 1630, a determination is made concerning whether the prefetch algorithm allows prefetch to occur. Prefetch operations are performed only if there is bandwidth available to support the prefetch operations. For example, a decision may be made that the prefetch will only occur to a depth of two. If the prefetch has already been performed to a depth of two, additional prefetch may not be performed to conserve system resources. Once the available data is used, additional prefetches are desirable.

Referring again to Step 1630, if the prefetch algorithm does not allow prefetch to occur, Step 1635 determines if software has terminated the prefetch operation 910 (FIG. 9). If the answer to this question is yes, a return is encountered and the process is ended. If the answer to this question is no, Step 1630 is again encountered.

Referring back to Step 1630, if the prefetch algorithm allows prefetch to occur, Step 1640 is encountered and an entry in the cache is acquired for the prefetch operation. In both Step 1630 and Step 1640 a determination is made as to whether the prefetch line is already available to the cache unit 315 (FIG. 3). From Step 1640, 1645 is encountered when an entry is not available from the cache. In Step 1645, the computed cache line address and device ID, I/O bus number and the transaction ID of the original request and the tag unit are set. These are determined from the DMA read request 505 (FIG. 5). The updated, newly computed cache line address 1620 is not used in this Step 1645. This is possible because the device ID, the I/O bus interface and the transaction ID do not change.

In Step 1650, requests the cache line from the system memory controller as read current. Within Step 1650 read current graphic or read current DMA value will be decided by the read current mode 545 (FIG. 5) field. Step 1650 also sets invalid equal to 1; share equal to 0; private equal to 0; dirty equal to 0; read current equal to 1; fetch in progress equal to 1 and split read equal to one. Finally, read request will be set equal to 0.

Figure 17:
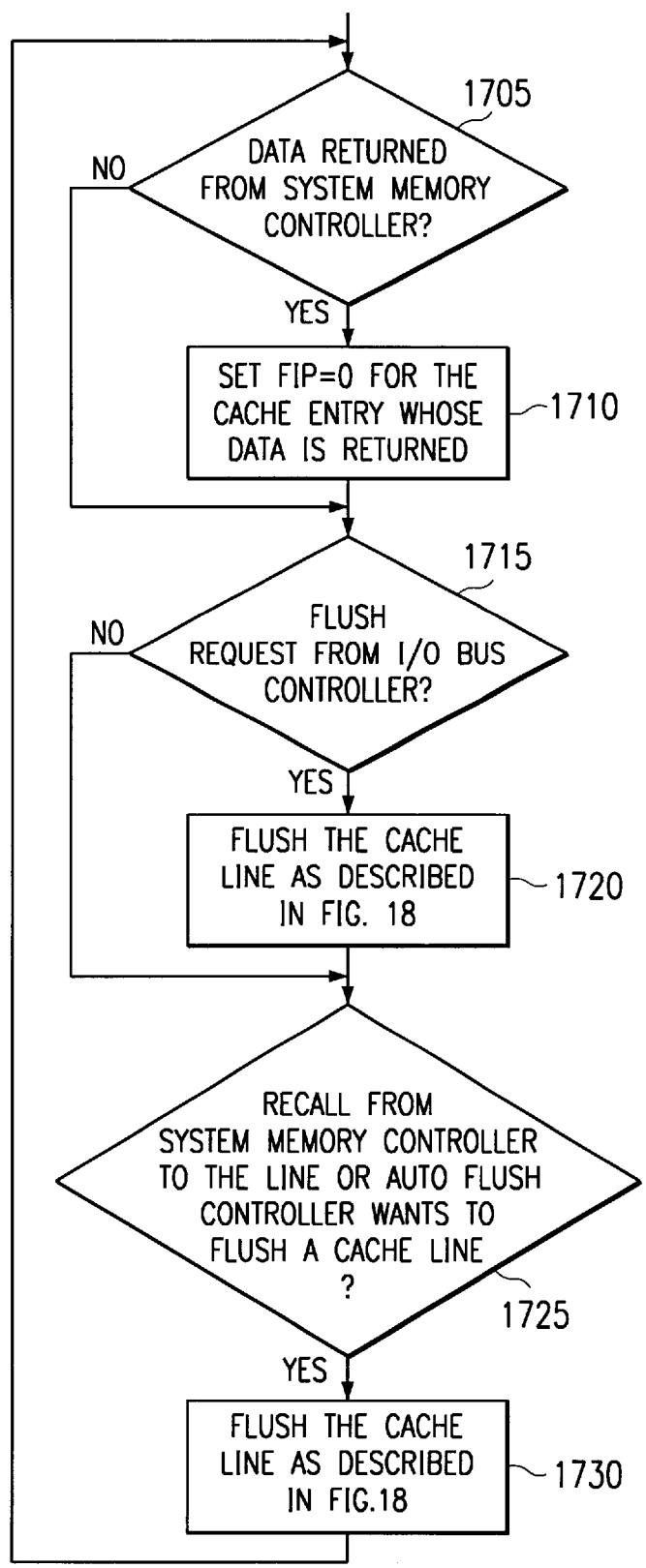
FIG. 17 shows a flow chart for the determination of whether cache status is validate or invalidate for cache lines.

FIG. 17 shows a flow chart used in the determination of whether a cache status is validate or invalidate. Step 1705 determines if data has been returned from the system memory controller. The cache unit 315 is normally monitoring the internal bus 310. If data is returned from the system memory controller in Step 1705, Step 1710 sets the fetch in progress indication to 0 for the cache entry corresponding to data that is returned. Step 1715 is reached through two different paths. First Step 1715 can be reached if the data is not returned from the system memory controller and second, Step 1715 can be reached if the data was returned from the system memory controller and the fetch in progress is set equal to 0 for the cache entry whose data is returned. In either case, a determination is made as to whether a flush request from the I/O bus controller. Part of this data is flushed when the cache line is flushed. In Step 1720, the cache line is flushed as described in FIG. 18. Step 1725 of FIG. 17 is also reached after performing any flush requests issued by the I/O controller. End of cache line detection control 715 (FIG. 7) may be used to send a message requesting a flush of a particular cache. In either case, at Step 1725 the system memory controller issues a recall to the line or auto flush controller the controller wants to flush the cache line. The first time through the system memory controller issues a recall to a particular cache line. If a recall has been issued from the system memory controller concerning a line or an auto flush, Step 1730 is encountered and ensures the cache line is flushed as describe in FIG. 18. The flow depicted in FIG. 17 then returns to Step 1705.

Figure 18:
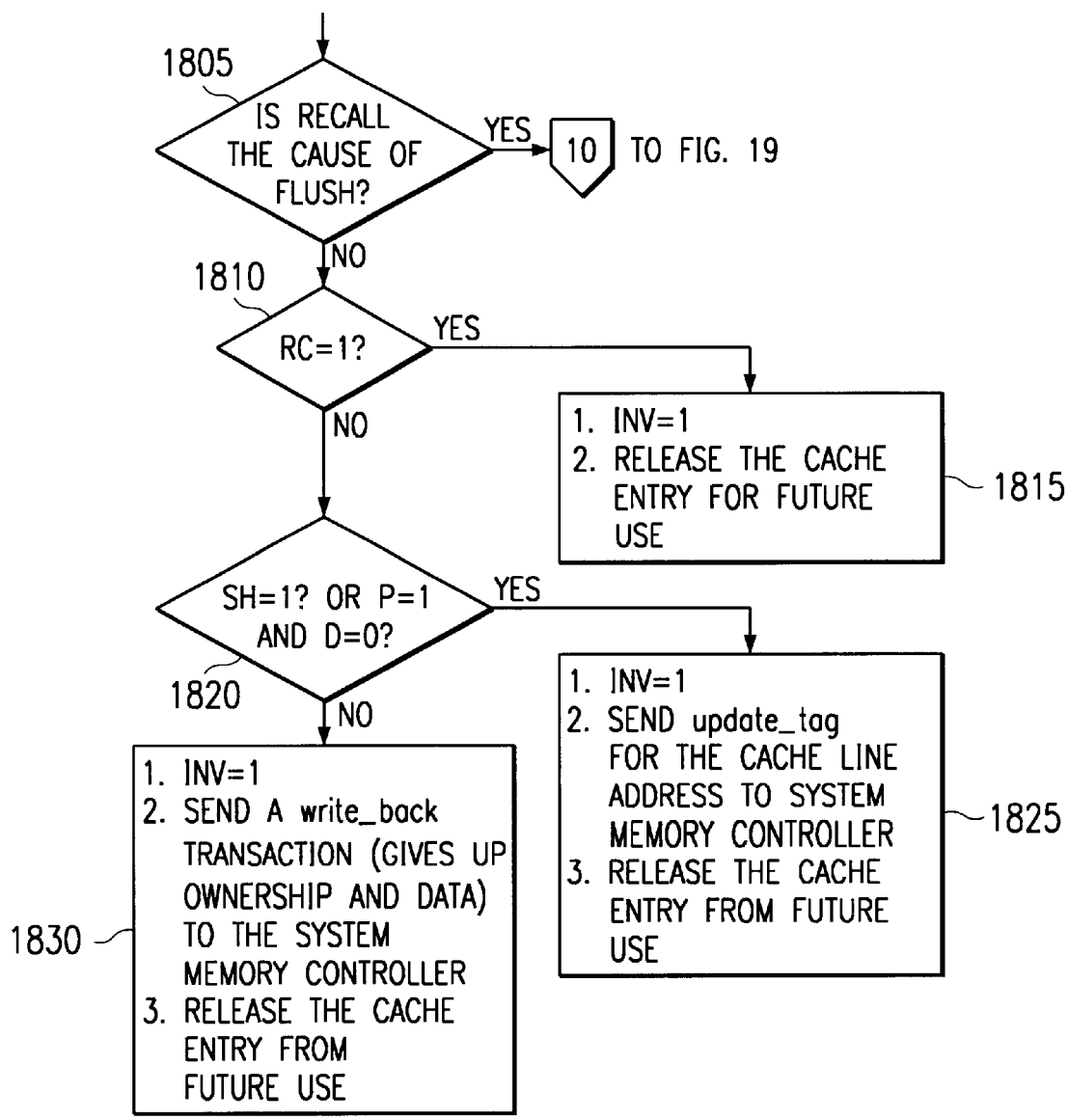
FIG. 18 shows a flow chart for the flush of a cache line.

FIG. 18 shows a flow diagram for the flush of a cache line. Step 1805 determines if a recall is the cause of the flush. If the recall is the cause of the flush, the flow continues at Step 1905 of FIG. 19. If the flush was not cause by a recall, Step 1810 is encountered.

Step 1810 determines if the read current is equal to 1. If the read current is equal to one, Step 1815 sets invalid equal to 1 and releases the cache entry for future use. If, in Step 1810, the read current is not equal to 1, Step 1820 determines if 1) share is equal to one or 2) if private is equal to one and dirty is equal to 0. If either of these two conditions are equal Step 1825 is encountered. In Step 1825, invalid is set equal to 1, the update_tag for the cache line address to the system memory controller is sent and release the cache entry from future use. Finally, in Step 1820, if 1) share is not equal to one nor 2) private is not equal to one or dirty is equal to one, Step 1830 is encountered. At Step 1830, invalid is set equal to 1, a write_back transaction is sent giving ownership and data to the system memory controller and release the cache entry from future use. A write_back transaction means the ownership of the cache line is being given up.

Figure 19:
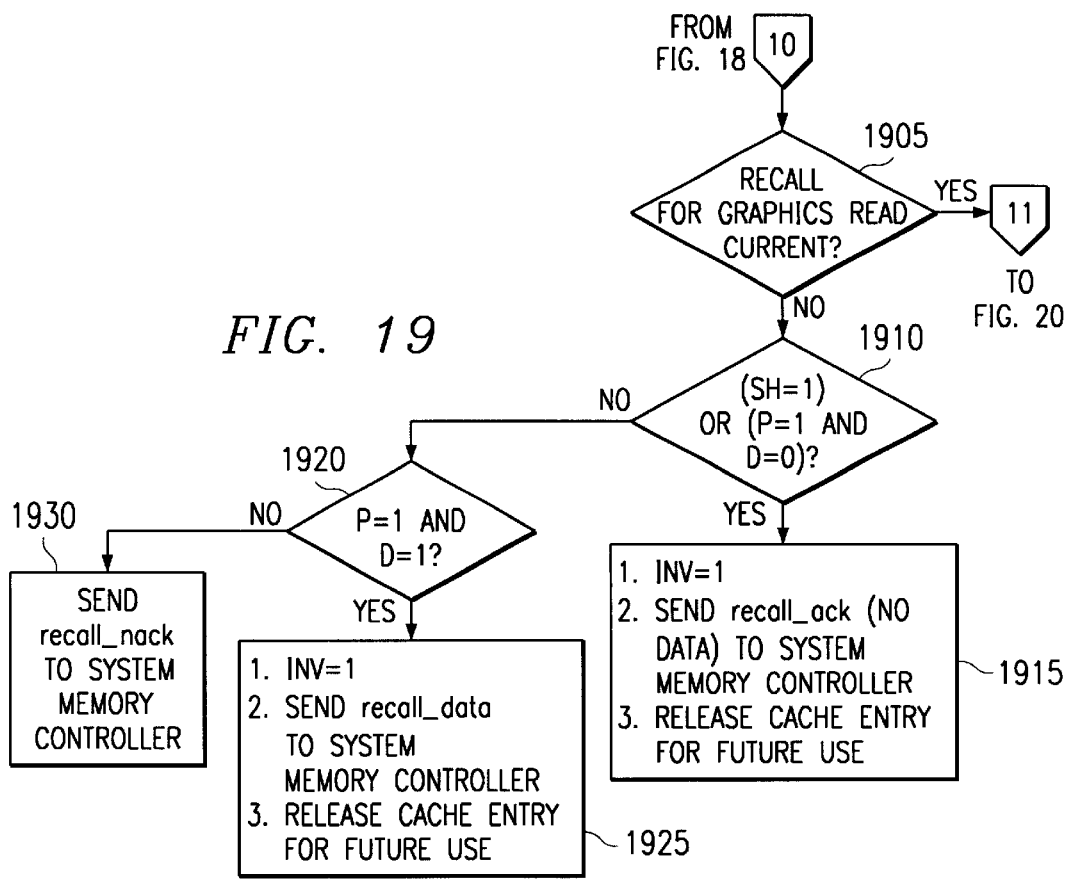
FIG. 19 shows a continuation of the flow chart of FIG. 18.

Referring to FIG. 19, Step 1905. Step 1905 determines if a recall for graphics read current has been issued. The difference between a graphic read current and a DMA read current is that the graphic read current will allow the original owner cache, if any, to keep ownership or keep any updated data, while a DMA read current will require the owner to give up their ownership.

Figure 20:
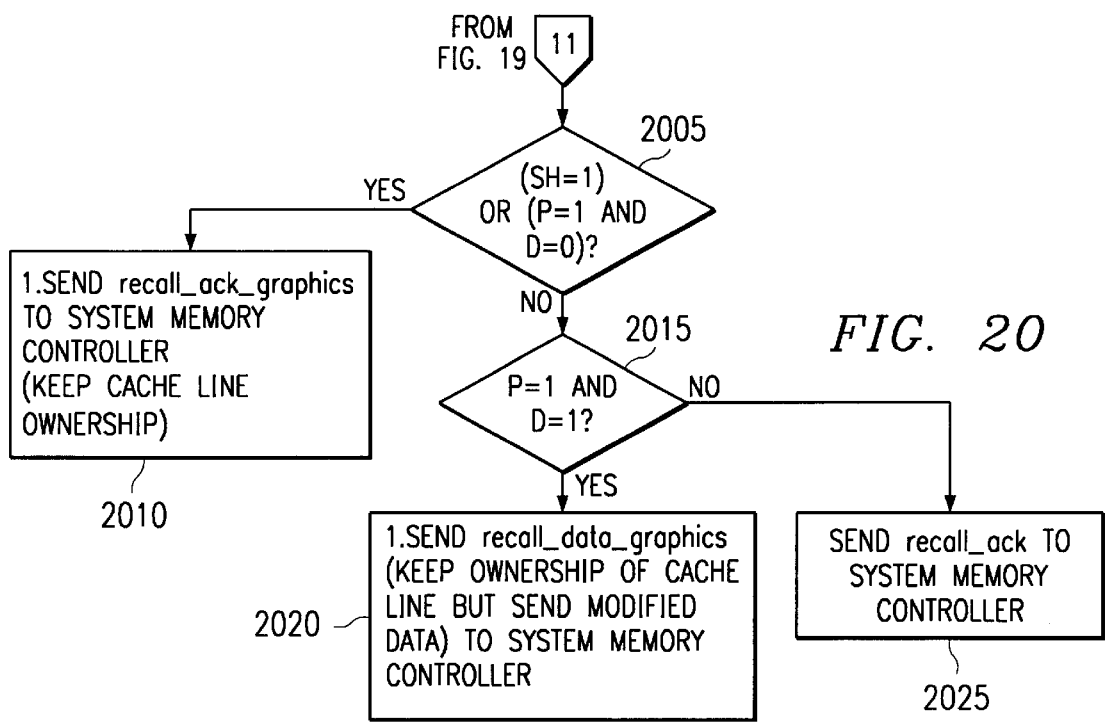
FIG. 20 shows a continuation of the flow chart of FIG. 19.

If a recall for graphics read current has bee issued, control is passed to Step 2005 of FIG. 20. If a recall has not been issued for graphics read current then Step 1910 is encountered. In Step 1910, a determination is made whether 1) share is equal to 1 or 2) private equals 1 and dirty equals 0. If either of these two conditions exists, Step 1915 is encountered and invalid is set equal to 1, the recall_ack (no data) is sent to the system memory controller and a the cache entry is release for future use. Alternatively, if neither of the two conditions are present 1) share is not equal to 1 or 2) private equals 0 or dirty equals 1, Step 1920 is encountered. In Step 1920 a determination is made as to whether private equals 1 and dirty equals 1. If both of these conditions are true, Step 1925 is encountered and invalid is equal to 1, a recall_data request is sent to the system memory controller and a release is issued to the cache entry for future use. Finally, if either private equals 0 or dirty equals 0, Step 1930 is encountered and a recall_nack is sent to the system memory controller.

FIG. 20 shows the continuation of the flush of the cache line. The processing shown in FIG. 20 is accessed through FIG. 19 when a recall is issued for a graphics read current operation. Step 2005 determines if 1) shared equals 1 or 2) private equals 1 and dirty equals 0. If either of those two conditions exists, Step 2010 is encountered and a recall_ack_graphics is sent to the system memory controller which allows the sender to keep ownership of the cache line. Alternatively, if neither of the conditions in Step 2005 exists, either 1) shared equals 0 and 2) private equals 0 or dirty equals 1, Step 2015 is encountered. At Step 2015, a determination is made whether private equals 1 and dirty equals 1. If both of these conditions are met, processing continues at Step 2020 with a recall data graphics command sent to the system memory controller allowing the current owner to retain ownership of the cache line and send modified data another I/O device. Alternatively, if either private equals 0 or dirty equals 0, Step 2025 is encountered in which a recall_ack is sent to the system memory controller.

What is claimed is:

1. A shared memory providing access to a plurality of agents, comprising:
   a memory; and
   a memory controller configured to selectively provide memory access to the agents in both coherent and read current modes of operation, said memory controller implementing a first set of rules in said coherent mode of operation to insure that all copies of data stored by the agents are coherent with data stored in said memory, and a second set of rules for providing a copy of data stored in said memory in said read current mode of operation.

2. The shared memory according to claim 1, wherein said second set of rules requires that the copy of data be provided as an output and then invalidated within a predetermined period of time.

3. The shared memory according to claim 1, wherein said second set of rules requires that the copy of data comprise no more than a predetermined maximum block size.

4. The shared memory according to claim 1, wherein said second set of rules requires that the copy of data include only that data contained within a range of memory addresses, said range beginning within a predetermined block of memory addresses and continuing through an end of block address.

5. The shared memory according to claim 1, wherein said second set of rules require that the copy of data be immediately transferred to an external device in a sequentially incremental fashion and that, upon completion of said transfer, the copy of data is flushed.

6. The shared memory according to claim 1, wherein said second set of rules require that detection of an error condition caused the copy of data to be flushed.

7. The shared memory according to claim 1, wherein said second set of rules include subsets of rules corresponding to payload traffic rules and control traffic rules.

8. The shared memory according to claim 1, wherein said first set of rules implement a MESI protocol.

9. A shared memory providing access to a plurality of agents, comprising:
   a memory; and
   a memory controller configured to selectively provide memory access to the agents in both coherent and read current modes of operation,
      (i) in said coherent mode of operation, said memory controller selectively providing at least two types of access to data stored in said memory, including
         (a) shared access to data stored in said memory to a plurality of said agents by providing each of said plurality of agents with a copy of said data, and
         (b) exclusive access to data stored in said memory to a requesting one of said agents wherein all pre-existing copies of said data maintained by others of said agents are invalidated prior to providing said requesting agent with said exclusive access and said data stored in said memory is updated to reflect changes made to said data by said requesting agent as part of terminating said exclusive access,
   said memory controller maintaining a status of each line of data being accessed by one or more of said agents in said coherent mode of operation including identification of each of said agents having a copy of corresponding ones of said lines of data and an indication of the type of access provided thereto,
      (ii) in said read current mode of operation, said memory controller providing a requesting agent with access to said memory to create a copy of data stored in said memory subject to a set of rules implemented by the agents.

10. The shared memory according to claim 9 wherein each of said agents include control logic implementing said set of rules.

11. The shared memory according to claim 9 wherein said set of rules include one of automatically deleting and flushing said copy of data.

12. The shared memory according to claim 9, wherein said set of rules include one or more of the following rules:
   (i) data supplied in said read current mode of operation is to be sequentially and incrementally transferred by the receiving agent beginning at a starting address through an end of block address;
   (ii) data supplied in said read current mode of operation is to be flushed by the receiving agent upon completion of a transfer operation;
   (iii) data supplied in said read current mode of operation is to be flushed by one of the agents upon detection of a first fault condition;
   (iv) data supplied in said read current mode of operation is to be flushed upon an interruption of a transfer of said data;
   (v) fetching operations to supply said copy of data are to be terminated upon detection of a second fault condition; and
   (vi) in response to a third fault condition, fetching operations to supply said copy of data are to be completed through an end of a corresponding DMA block address and said copy of said data is to be flushed.

13. The shared memory according to claim 12 wherein each of the agents includes control logic selectively implementing all of said rules.

14. A method of providing memory access to a plurality of agents, comprising the steps of:
   selectively providing memory access in a coherent mode of operation including implementing a first set of rules insuring that all copies of data stored by the agents are coherent with data stored in said memory; and
   selectively providing read current memory access implementing a second set of rules for providing read only access to data stored in said memory.

15. The method according to claim 14 further comprising the steps of:
   creating a cache copy of data using said read current memory access;
   transferring to a peripheral device said cache copy of data; and
   flushing said cache copy of data.

16. The method according to claim 15 wherein said transferring step includes a sequentially incremental transfer of said cache copy of data.

17. The method according to claim 14 wherein said second set of rules include subsets of rules corresponding to payload traffic rules and control traffic rules.

18. The method according to claim 14 wherein said first set of rules implement a MESI protocol.

19. The method according to claim 14 wherein said second set of rules include one or more of the following rules:
   (i) data supplied in said read current mode of operation is to be sequentially and incrementally transferred by a receiving agent beginning at a starting address through an end of block address;
   (ii) data supplied in said read current mode of operation is to be flushed by a receiving agent upon completion of a transfer operation;
   (iii) data supplied in said read current mode of operation is to be flushed by one of the agents upon detection of a first fault condition;
   (iv) data supplied in said read current mode of operation is to be flushed upon an interruption of a transfer of said data;
   (v) fetching operations performed in said read current mode of operation are to be terminated upon detection of a second fault condition; and
   (vi) in response to a third fault condition, fetching operations performed to a cache in said read current mode of operation are to be completed through an end of a corresponding DMA block address and said cache is to be flushed.

20. The method according to claim 19 wherein each of the agents includes control logic selectively implementing all of said rules.

* * * * *